(12) United States Patent
Gornowicz et al.

(10) Patent No.: US 7,649,535 B2
(45) Date of Patent: Jan. 19, 2010

(54) LAYERING METHOD FOR FEATHER ANIMATION

(75) Inventors: Galen Gerald Gornowicz, Pasadena, CA (US); Andrew John Weber, Glendale, CA (US)

(73) Assignee: DreamWorks Animation LLC, Glendale, CA (US)

( * ) Notice: Subject to any disclaimer, the term of this patent is extended or adjusted under 35 U.S.C. 154(b) by 609 days.

(21) Appl. No.: 11/408,805

(22) Filed: Apr. 21, 2006

(65) Prior Publication Data

US 2007/0270092 A1 Nov. 22, 2007

(51) Int. Cl.
*G06T 13/00* (2006.01)

(52) U.S. Cl. .................. 345/473; 345/442; 345/630; 345/647

(58) Field of Classification Search .......... 345/420, 345/581, 473
See application file for complete search history.

(56) References Cited

U.S. PATENT DOCUMENTS

| | | | |
|---|---|---|---|
| 6,559,849 B1 * | 5/2003 | Anderson et al. | 345/474 |
| 6,720,962 B1 | 4/2004 | Alter | |
| 6,952,218 B1 | 10/2005 | Bruderlin | |
| 7,050,062 B2 * | 5/2006 | Bruderlin | 345/581 |
| 7,088,374 B2 | 8/2006 | David et al. | |
| 7,098,911 B2 * | 8/2006 | Chen et al. | 345/420 |
| 7,355,600 B2 * | 4/2008 | Baraff et al. | 345/473 |
| 7,427,991 B2 * | 9/2008 | Bruderlin et al. | 345/581 |
| 2003/0179203 A1 | 9/2003 | Bruderlin et al. | |
| 2004/0030741 A1 | 2/2004 | Wolton et al. | |
| 2005/0212800 A1 * | 9/2005 | Petrovic et al. | 345/426 |
| 2006/0158453 A1 * | 7/2006 | Bruderlin et al. | 345/582 |

OTHER PUBLICATIONS

Jia-chi Wu and Zoran Popović, "Realistic modeling of bird flight animations", ACM Transactions on Graphics (TOG), vol. 22, Issue 3 (Jul. 2003), pp. 888-895.*
Streit L. and Heidrich W., "A biologically-parameterized feather model", L Streit, W Heidrich—Computer Graphics Forum, 2002.*
International Search Report and Written Opinion mailed Feb. 7, 2008, for PCT Application No. PCT/US07/09650 filed Apr. 19, 2007, 11 pages.
Anjyo, Ken-ichi et al. (1992) "A Simple Method for Extracting the Natural Beauty of Hair," Proceedings of SIGGRAPH 1992, pp. 111-120.

(Continued)

*Primary Examiner*—Xiao M. Wu
*Assistant Examiner*—Phi Hoang
(74) *Attorney, Agent, or Firm*—Morrison & Foerster LLP

(57) ABSTRACT

A method of animating feather elements includes: specifying initial positions for a skin surface and for feather elements; specifying positions for the skin surface at an animated time; determining a feather-ordering sequence for placing the feather elements on the skin surface; determining positions for skirt elements that provide spatial extensions for the skin surface at the animated time; determining positions for feather-proxy elements that provide spatial extensions for the feather elements at the animated time; and determining positions for the feather elements at the animated time by extracting the feather elements from the feather-proxy elements. The feather-proxy elements are determined from the skirt elements according to the feather-ordering sequence, and the feather-proxy elements satisfy a separation criterion for avoiding intersections between the feather-proxy elements.

41 Claims, 39 Drawing Sheets

OTHER PUBLICATIONS

Fletcher, R. (1987) "Conjugate Direction Methods," Chapter 4 In *Practical Methods of Optimization*, John Wiley & Sons, pp. 80-94.

Foley, James D. et al. (1990) "Animation" Chapter 21 In *Computer Graphics: Principles and Practice, 2nd ed.*, Addison-Wesley Publishing Company, pp. 1057-1081.

Marsden, Jerrold et al. (1985) "Path Independence," Chapter 18.2 In *Calculus III*, 2nd ed., Springer-Verlag, pp. 895-901.

Press, William H. et al. (1988) "Linear Programming and the Simplex," Chapter 10.8 In *Numerical Recipes in C: The Art of Scientific Computing*, Cambridge University Press, pp. 329-343.

Riley, William F. et al. (1989) *Introduction to Mechanics of Materials*, John Wiley & Sons, pp. 62-64, 346-379, 453.

Tong, Yiying, et al. (Jul. 2003) "Discrete Multiscale Vector Field Decomposition," ACM Transactions in Graphics, 22(3): 445-452.

\* cited by examiner

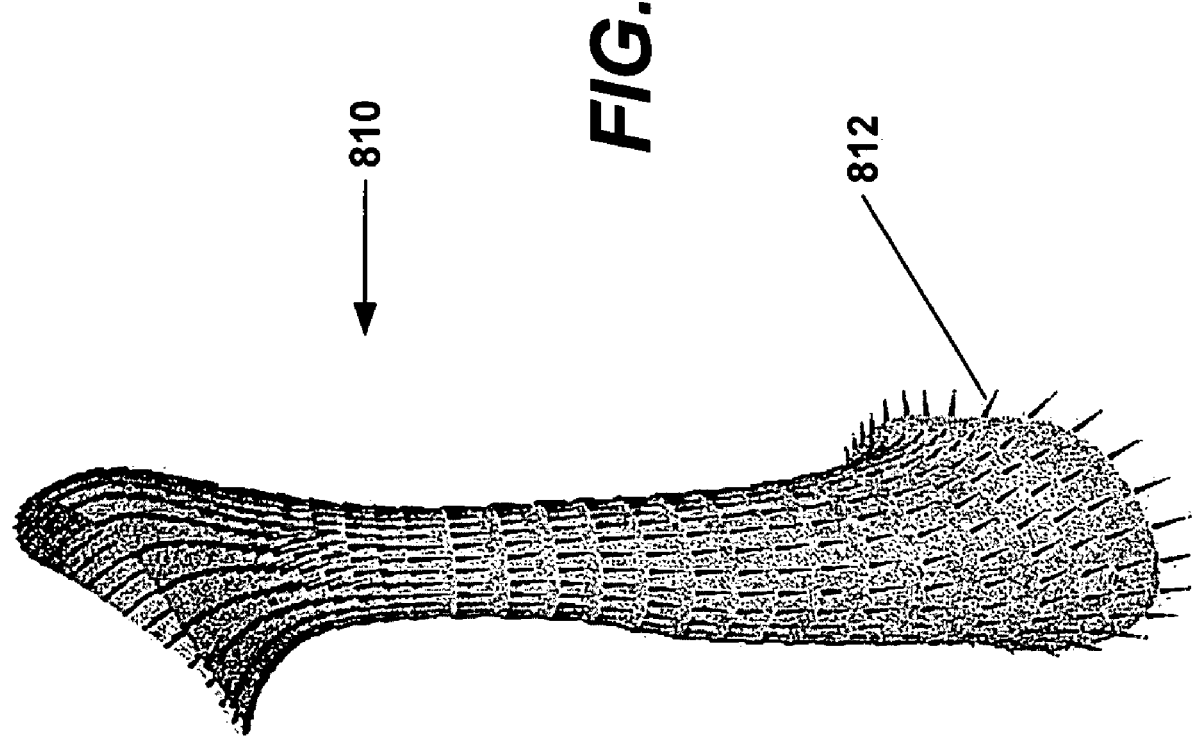

LAYERING METHOD FOR FEATHER ANIMATION

BACKGROUND OF THE INVENTION

The present invention relates to animation technology generally and more particularly to the animation of feathers and related surface-attached elements.

Media productions have employed increasingly complex animations in order to construct increasingly realistic images. In addition to animating surfaces, increasing attention has been directed towards surface-attached elements including feathers, hair, and fur. (U.S. Pat. App. 2003/0179203; U.S. Pat. No. 6,720,962; U.S. Pat. No. 6,952,218)

Feathers, in particular, have been a challenging subject since the early days of animation. Birds of early animation films were often secondary characters with relatively few unrealistic feathers. Although more realistic effects have been achieved in modern animation, challenges remain especially for animating birds with a large number of feathers throughout an animation sequence. For example, when using conventional animation techniques, individual feathers are likely to intersect with one another or the skin surface so that the animation is unrealistic. In addition to these intersections (also known as interpenetrations or collisions), the layering of the feathers may be inconsistent when the frames are independently developed for an animation sequence so that feathers "pop" from frame to frame.

A number of somewhat unrealistic solutions have been tried including, for example, setting the feathers at fixed angles with sufficient spacing between feathers to avoid interpenetrations. Also, by making the coloring uniform, a certain degree of feather interpenetration can be tolerable (i.e., minimally visible). Additionally, manual intervention can be introduced to correct for the defects of automation.

Thus, there is a need for improved animation for feathers and related surface-attached elements.

SUMMARY OF THE INVENTION

In one embodiment of the present invention, a method of animating feather elements includes: specifying initial positions for a skin surface; specifying initial positions for feather elements; specifying positions for the skin surface at an animated time; determining a feather-ordering sequence for placing the feather elements on the skin surface; determining positions for skirt elements that provide spatial extensions for the skin surface at the animated time; determining positions for feather-proxy elements that provide spatial extensions for the feather elements at the animated time; and determining positions for the feather elements at the animated time by extracting the feather elements from the feather-proxy elements. Each feather element includes a shaft having a root at a proximal end for attaching the feather element to the skin surface at a root-attachment point and a tip at a distal end away from the skin surface, and the feather element further includes vane structures extending laterally from the shaft. The feather-proxy elements are determined from the skirt elements according to the feather-ordering sequence, and the feather-proxy elements satisfy a separation criterion for avoiding intersections between the feather-proxy elements.

According to one aspect of this embodiment, the method may further include: determining a feather-ordering function defined on at least a portion of the skin surface so that values of the feather-ordering function at the root-attachment points of the feather elements determine the feather-ordering sequence. According to another aspect, the method may further include: determining skirt-placement curves on the skin surface at selected locations on the skin surface for placing the skirt elements; and determining a skirt-ordering sequence for placing the skirt elements on the skin surface, wherein determining the positions for the skirt elements at the animated time includes placing the skirt elements on the skin surface at the animated time according to the skirt-ordering sequence.

According to another aspect, the method may further include: determining feather-proxy-placement curves on the skin surface at selected locations that include the root-attachment points for the feather elements, wherein determining the positions for the feather-proxy elements at the animated time includes: forming the feather-proxy elements at the animated time by extending the feather-proxy-placement curves outwardly from the skin surface through an interpolation of nearby skirt elements at the animated time; and adjusting one or more control points of the feather-proxy elements to avoid intersections with the skin surface and with feather-proxy elements that are earlier in the feather-ordering sequence.

According to another aspect, the separation criterion may include adjusting one or more control points of the feather-proxy elements to avoid intersections with feather-proxy elements that are earlier in the feather-ordering sequence. According to another aspect, determining the positions for the feather elements at the animated time may include projecting feather geometries onto corresponding feather-proxy elements to extract the feather elements from the feather-proxy elements. According to another aspect, the method may further include: determining the positions for the skin surface at the animated time by animating the skin surface to the animated time from an initial time associated with the initial positions.

According to another aspect, the animated time may be a first animated time and the method may further include: specifying positions for the skin surface at a second animated time; determining positions for a plurality of second skirt elements that provide spatial extensions for the skin surface at the second animated time; determining positions for a plurality of second feather-proxy elements that provide spatial extensions for the feather elements at the second animated time; and determining positions for the feather elements at the second animated time by extracting the feather elements from the second feather-proxy elements. The second feather-proxy elements are determined from the second skirt elements according to the feather-ordering sequence, and the second feather-proxy elements satisfy a separation criterion for avoiding intersections between the second feather-proxy elements. The positions of the feather elements at the first and second animated times provide consistent relative placement of the feather elements. More generally, the above-described process can be carried out independently for multiple animated times. (Note that the words "first" and "second" are used here and elsewhere for labeling purposes only and are not intended to denote any spatial or temporal ordering. Furthermore, the labeling of a "first" element does not imply the presence a "second" element.)

In another embodiment of the present invention, a method of determining a feather-ordering sequence for animating feather elements includes: specifying initial positions for a skin surface; specifying initial positions for a plurality of feather elements; determining an initial vector field on at least a portion of the skin surface from the initial positions for the feather elements; determining a feather-ordering vector field from the initial vector field to enable an integration of the feather-ordering vector field; and determining the feather-ordering function through the integration of the feather-ordering vector field. Each feather element includes a shaft having a root at a proximal end for attaching the feather element to the skin surface at a root-attachment point and a tip at a distal end away from the skin surface, and the feather element further includes vane structures extending laterally from the shaft. The initial vector field includes a plurality of vectors and each vector has a magnitude and a direction. The values of the feather-ordering function at the root-attachment points of the feather elements determine the feather-ordering sequence for animating the feathers elements.

According to one aspect of this embodiment, determining the feather-ordering vector field may include adjusting at least some vector magnitudes of the initial vector field to enable an integration of the feather-ordering field. According to another aspect, the method may further include: determining a plurality of skirt-placement curves on the skin surface by evaluating the feather-ordering function at selected locations on the skin surface; and determining a skirt-ordering sequence for placing a plurality of skirt elements on the skin surface from values of the feather-ordering function on the skirt-placement curves, wherein the skirt elements provide spatial extensions for the skin surface.

According to another aspect, the method may further include: determining feather-proxy-placement curves on the skin surface by evaluating the feather-ordering function to determine feather-proxy-placement curves that include the root-attachment points of the feather elements; forming a plurality of feather-proxy elements according to the feather-ordering sequence by extending portions of the feather-proxy-placement curves outwardly from the skin surface through an interpolation of nearby surface-defining elements; adjusting one or more control points of the feather-proxy elements to avoid intersections with the skin surface and with feather-proxy elements that are earlier in the feather-ordering sequence; and extracting updated positions for the feather elements from the adjusted feather proxy elements.

Additional embodiments relate to an apparatus that includes a computer that executes instructions for carrying out any one of the above-described methods. For example, the computer may include a processor with memory for executing at least some of the instructions. Additionally or alternatively the computer may include a specialized microprocessor or other hardware for executing at least some of the instructions. Additional embodiments also relate to a computer-readable medium that stores (e.g., tangibly embodies) a computer program for carrying out any one of the above-described methods with a computer. In these ways the present invention enables improved animation for feathers and related surface-attached elements.

BRIEF DESCRIPTION OF THE DRAWINGS

FIG. 8B shows a potential function evaluated on the skin surface of FIG. 2.

DETAILED DESCRIPTION OF EXEMPLARY EMBODIMENTS

Figure 1:
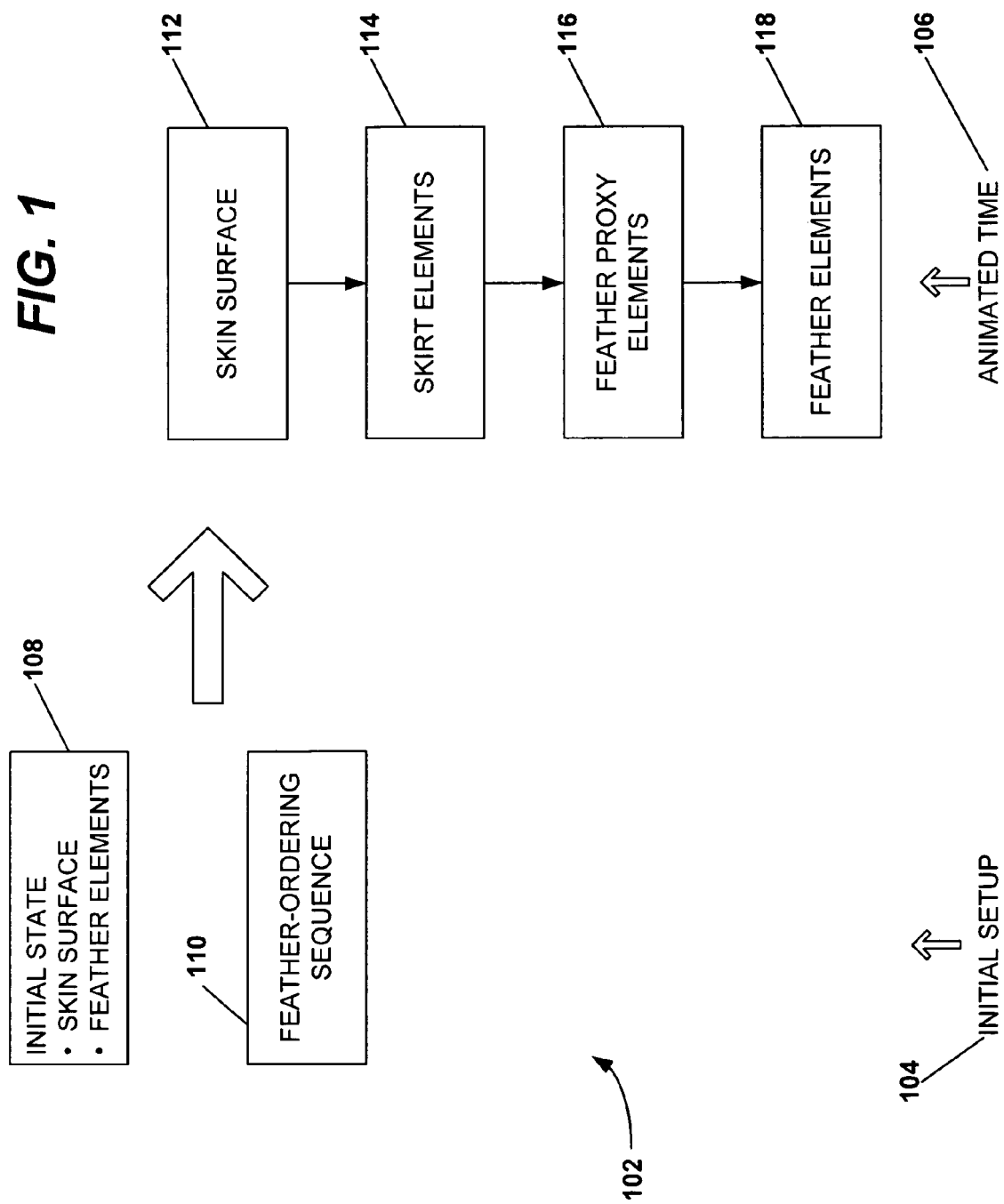
FIG. 1 shows an exemplary method of animating feather elements.

An embodiment of the present invention is shown in FIG. 1. An exemplary method 102 of animating feather elements includes determining positions of feather elements 118 at an animated (e.g., future) time 106 from an initial setup 104. In the initial setup 104, positions for an initial state 108 are specified for a skin surface and for multiple feather elements. In this context the positions can be any characterization for the placement of geometric elements including, for example, a parameterized Cartesian representation in two or three dimensions or a more complex basis-function representation. In some contexts, the placement of an array of elements (or points) defines a geometric shape or surface in the animation process. In general this geometric characterization (e.g., 3D scene data) should be usable as an input for a subsequent rendering operation. (*Computer Graphics: Principles and Practice* (2nd ed.), J. Foley, A. van Dam, S. Feiner, and J. Hughes, Addison-Wesley, 1990)

As discussed below in further detail, entities associated with the initial setup 104 include a feather ordering sequence 110 as well as the initial state 108, and entities associated with the animated time 108 include a skin surface 112, skirt elements 114, and feather proxy elements 116 as well as feather elements 118. In some contexts below, more concise labels will be used including "skirt" for a skirt element, "proxy" for a feather proxy element, and "feather" for a feather element.

Figure 2:
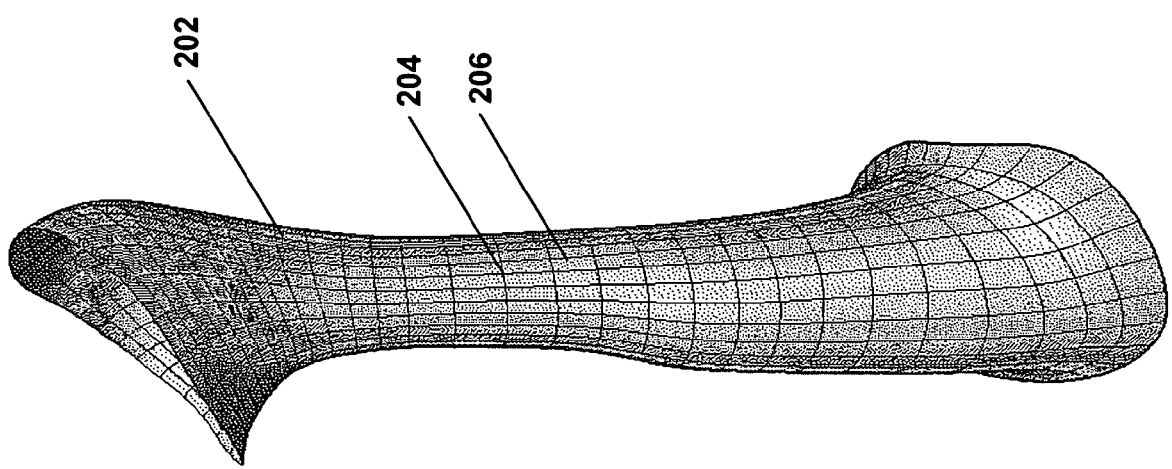
FIG. 2 shows an initial state for an exemplary skin surface that models the neck of a bird.

FIG. 2 shows an exemplary initial state 108 for a skin surface 202 that represents a bird's neck. The initial state 108 provides a reference state from which animations can be calculated. For example, an artist's depiction of a "rest pose" or "model pose" can be used for this purpose. The skin surface 202 also includes local coordinates (e.g., latitude 204 and longitude 206) for referencing attachment points for other elements including feather elements.

Figure 3:
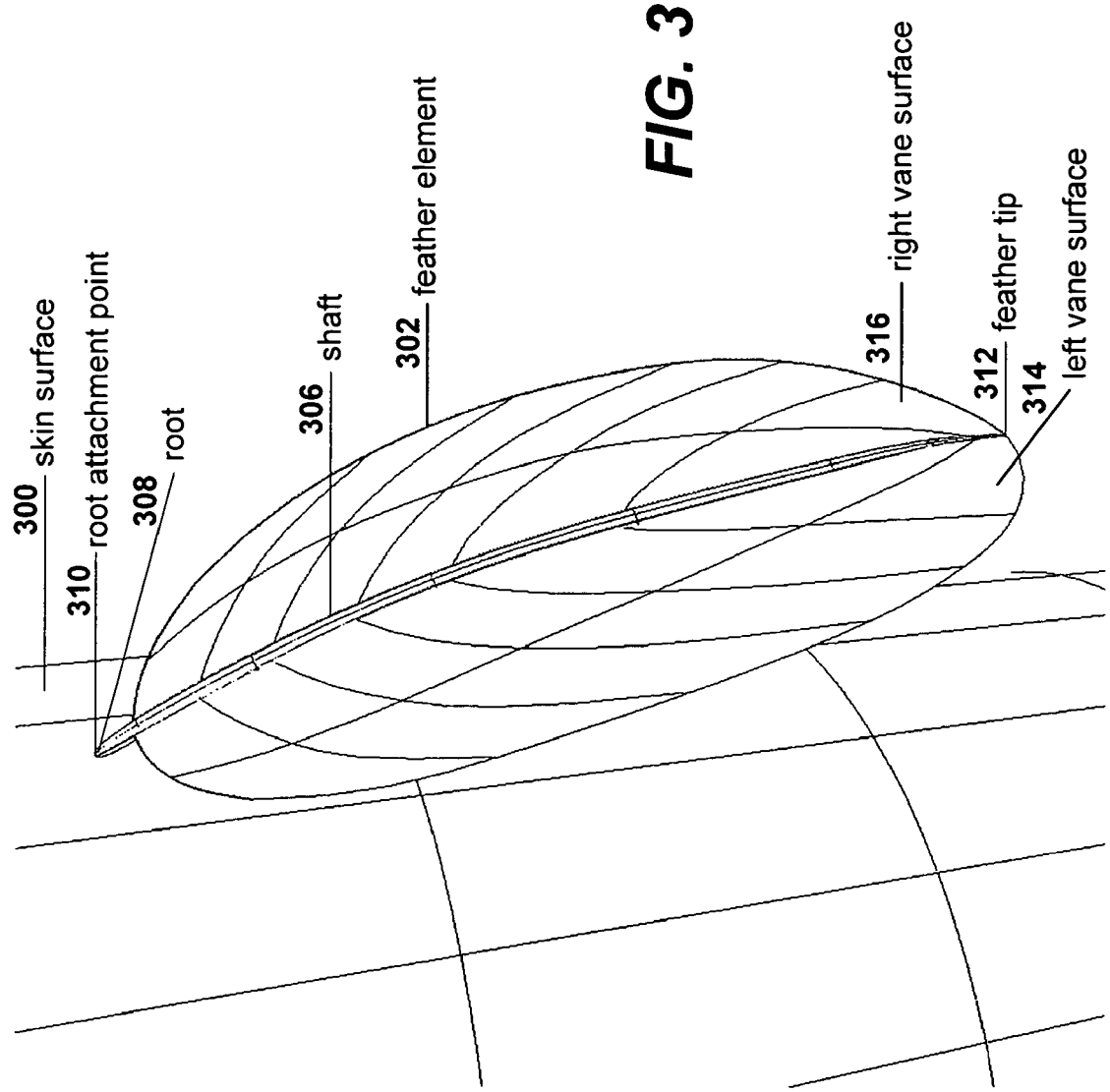
FIGS. 3 and 4 show a feather element that is used with the skin surface of FIG. 2.
Figure 4:
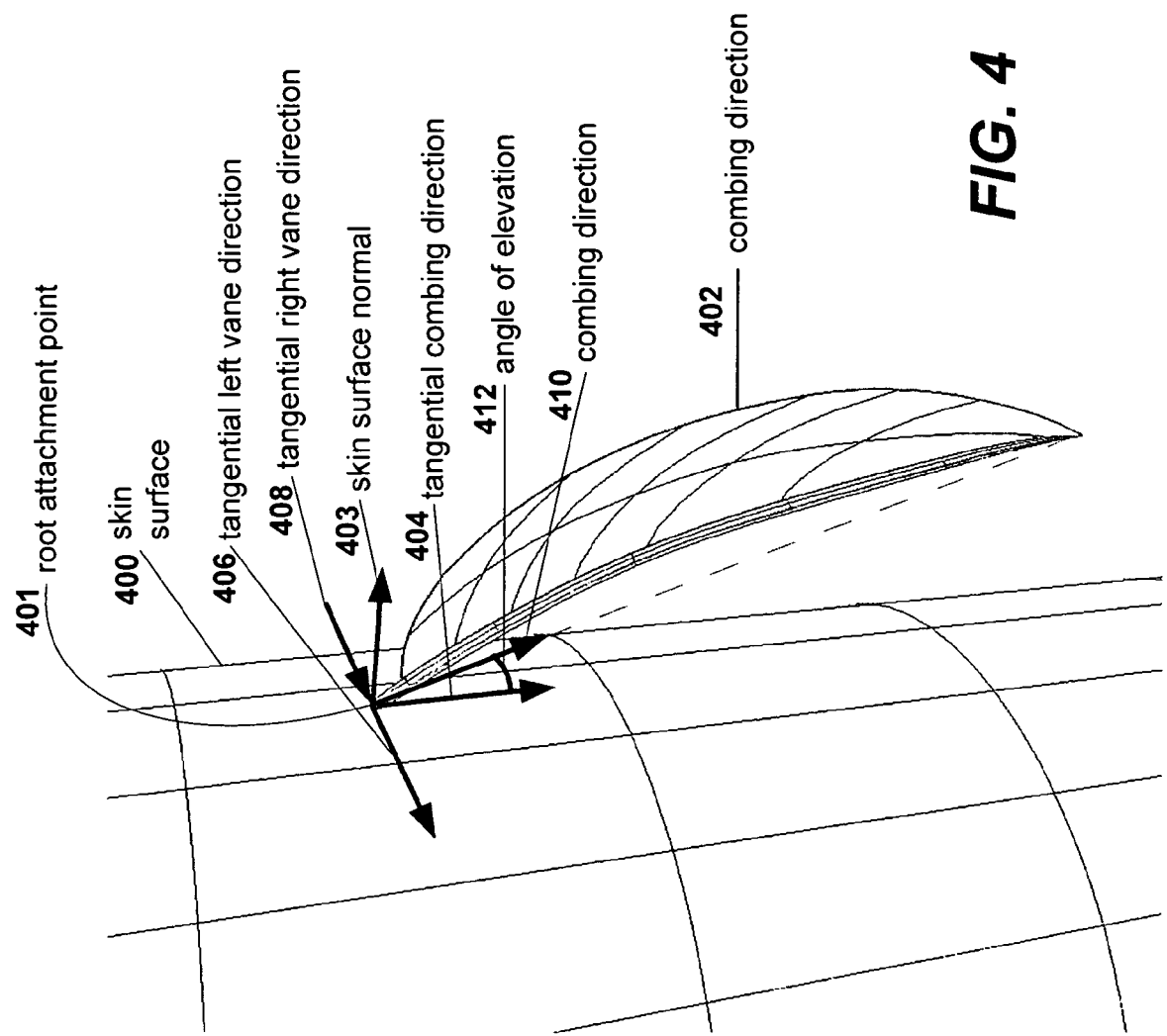

FIG. 3 shows a feather element 302 attached to the skin surface 300. The feather element 302 includes a shaft 306 having a root 308 at a proximal end for attaching the feather element 302 to the skin surface 300 at a root-attachment point 310, a tip 312 at a distal end away from the skin surface 202, and left and right vane structures 314, 316 extending laterally from the shaft 306. FIG. 4 shows another depiction of the feather element 402 that includes characterizations of the geometric relationships between the feather element 402 and the skin surface 400. For example, local coordinates can be defined at the root attachment point 401 by the skin surface normal 403 and the corresponding skin surface tangent plane, which can be parameterized by a tangential combing direction vector 404 and a surface tangent in the left and right vane directions 406, 408. A combing direction vector 410, which extends from the root 308 to the tip 312 and has an elevation angle 412 with respect to the tangent plane, can be projected onto the tangent plane to define the tangential combing direction vector 404. In this context the term "feather element" can apply to other computer-generated elements that include linear components (e.g., shafts) with lateral extensions (e.g., vanes) so that these elements can be arranged in overlapping configurations on a surface. For example, these elements may include leaves, scales, cloth, grass, hair, or fur. And similarly the term "skin surface" can apply to any surface that is suitable for attaching these elements.

Figure 5:
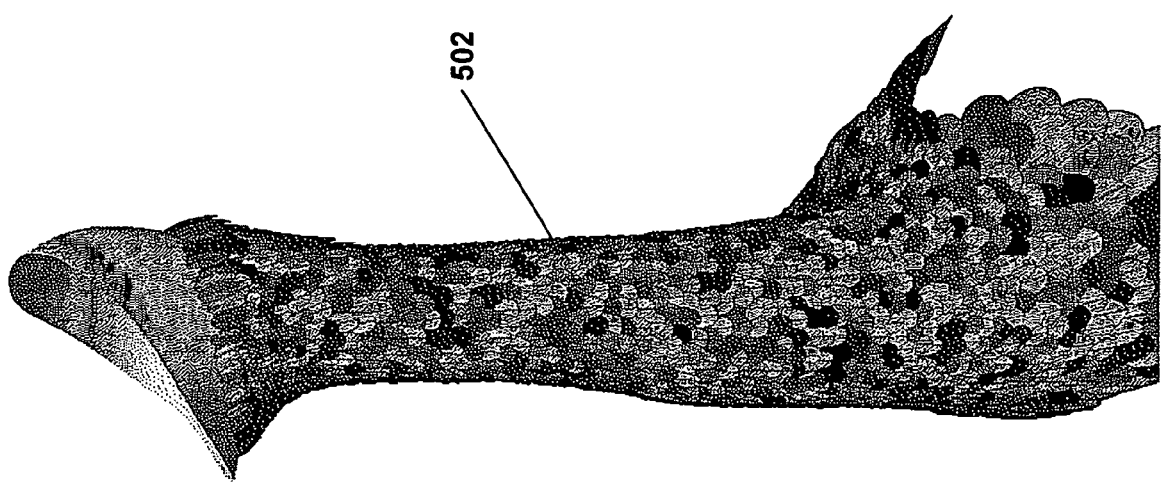
FIGS. 5 and 6 show an artist's depiction of a rest pose for a bird's neck that is consistent with the skin surface of FIG. 2.
Figure 6:
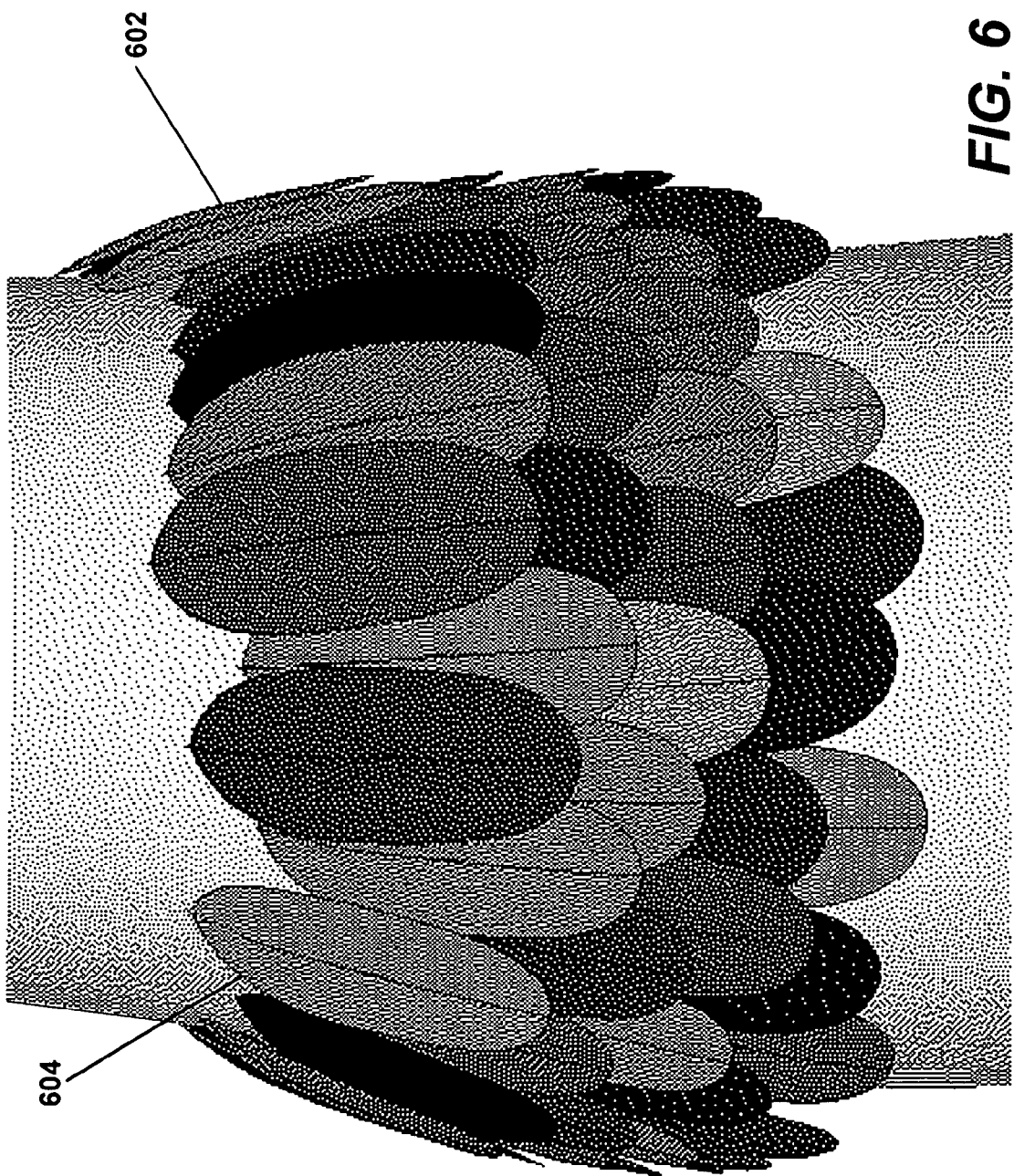

Positions for the initial state 108, which includes both the skin surface 202 and the feather elements 302 attached thereto, are typically specified as inputs for the processes of the present invention. FIG. 5 shows an artist's depiction of a rest pose 502 that can be used for this purpose (e.g., for extracting suitable positions for the initial state 108). Typically for the rest pose 502, feathers have been manually groomed and placed to ensure appropriate size, placement, and direction. However, some intersections (i.e., interpenetrations) between the feathers are possible. FIG. 6 shows a close-up view of a portion 602 of the rest pose 502 with greater detail for the feather elements 604. Of course, this representation of a bird's neck is likely to be just one component of a much more complex image, which may contain multiple birds.

One aspect of the present invention is the introduction of a feather-ordering sequence 110 as part of the initial setup 104 in order to mitigate the problems related to the interpenetration of feather elements 302 in the animation process. As discussed below in greater detail, the feather-ordering sequence 110 determines an ordering for attaching the feather elements 302 to the skin surface 202 in a natural way that is relatively stable across the animation sequence. Preferably, the feather-ordering sequence 110 reflects the orientations of the feather elements 302 in the rest pose 502.

Figure 7:
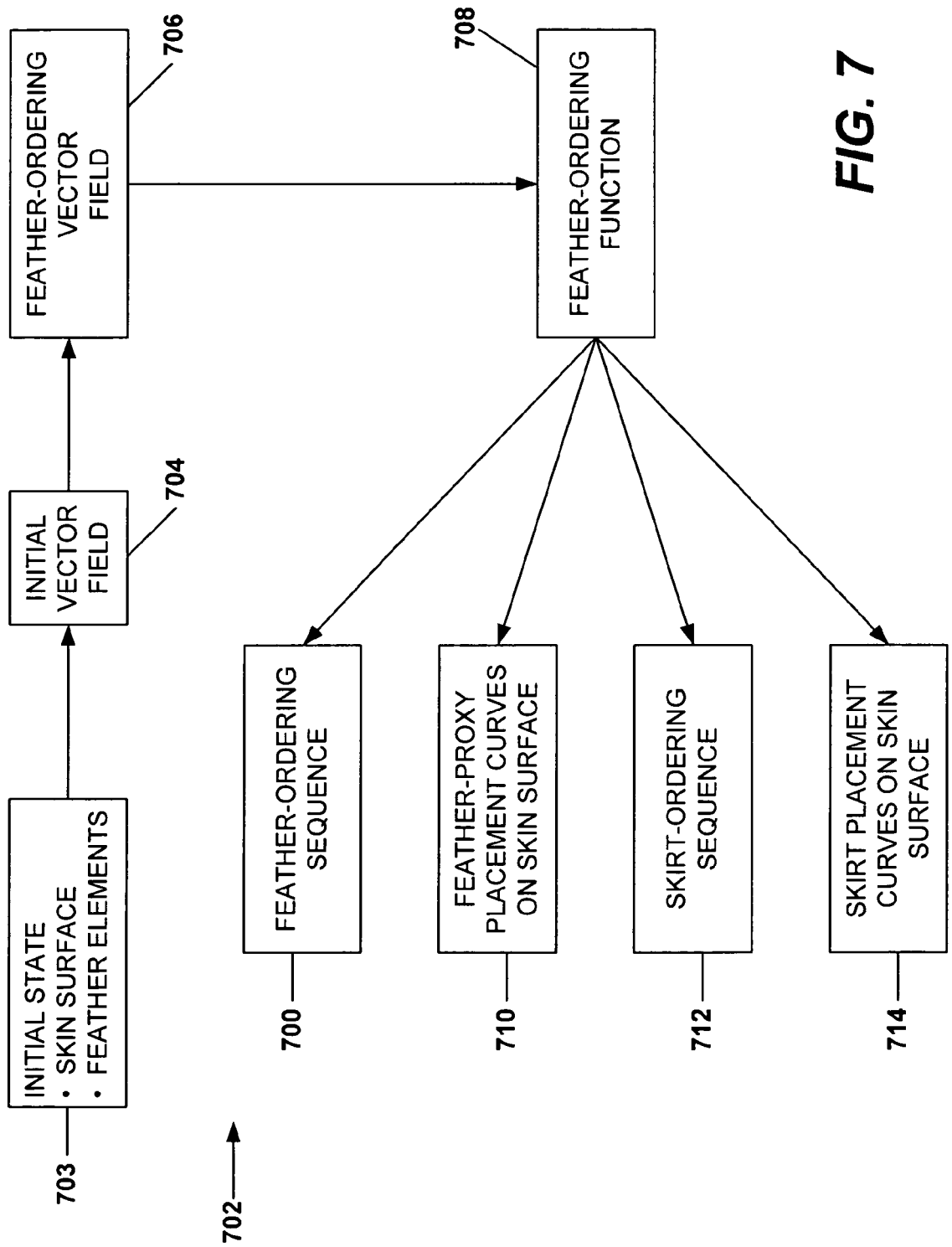
FIG. 7 shows an exemplary method of determining a feather-ordering sequence.

An exemplary method 702 of determining the feather-ordering sequence 700 from the initial state 703 is shown in FIG. 7. From the initial state 703 an initial vector field 704 on the skin surface 202 is determined by estimating the tangential combing direction vectors 404 for the feather elements 302. This calculation is a routine vector projection that is carried out in local surface coordinates on the skin surface 202 (e.g., along the latitudinal 204 and longitudinal 206 directions). The vectors can be characterized, for example, by a magnitude and a direction in the local coordinates illustrated in FIG. 4.

Next, a feather-ordering vector field 706 is determined from the initial vector field 704 to enable an integration of the feather-ordering vector field. In general, this requires zero vorticity for the vector field:

$$\frac{\partial u}{\partial y} - \frac{\partial v}{\partial x} = 0 \tag{1}$$

for the vector field (u,v) with local positions (x,y) in the plane (or a simply connected subset of the plane). (*Calculus III*, H. Marsdan and A. Weinstein, Springer-Verlag (New York, 1985), p. 896.) Vorticity relates to a measure of the rate of rotational spin in a fluid whose velocity field is given by the vector field. When the vorticity vanishes identically (also known as irrotational flow), the vector field can be integrated so that the vector field is the gradient of a potential function:

$$u = -\frac{\partial \phi(x, y)}{\partial x} \tag{2}$$
$$v = -\frac{\partial \phi(x, y)}{\partial y}.$$

In the present case, if the initial vector field 704 has zero vorticity, then this field is also taken to be the feather-ordering vector field 706. More generally, an integrable feather-ordering vector field 706 must be extracted from the initial vector field 704. A variety of methods are possible for extracting an integrable vector field from a non-integrable vector field including the Helmholtz-Hodge decomposition. ("Discrete Multiscale Vector Field Decomposition", Y. Tong, S. Lobeyda, A. Hirani, and M. Desbrun, ACM Transactions in Graphics, vol. 22, Issue 3, July 2003 (6 pages).) Even if the skin surface 202 is not simply connected, typically it can be extended or restricted to a simply connected surface, and so the basic theory applies.

The potential function φ(x,y) then becomes the feather-ordering function 708 where x and y take on values on the skin surface 202, for example, along the longitudinal 206 and latitudinal 204 coordinates respectively. The feather-ordering sequence 110 is then derived by the evaluating the feather-ordering function 708 for each feather element 302 at its root attachment point 310 on the skin surface 300 and ordering the values from lowest to highest to determine the feather-ordering sequence (i.e., $f_1 \leq f_2 \leq f_3 \leq \ldots \leq f_n$). This sequence desirably reflects the orientation of the feather elements 302 for placement of the feather elements 302 on the skin surface 300 in the animation process. As discussed below in further detail, the feather-ordering function 708 also enables the determination of related feather-proxy placement curves 710 for placing feather proxy elements that spatially overbound feather elements on the skin surface 300. Additionally the feather-ordering function 708 enables the determination of a skirt-ordering sequence 712 and related skirt-placement curves 714 for placing barrier surfaces on the skin surface 300.

Figure 8A:
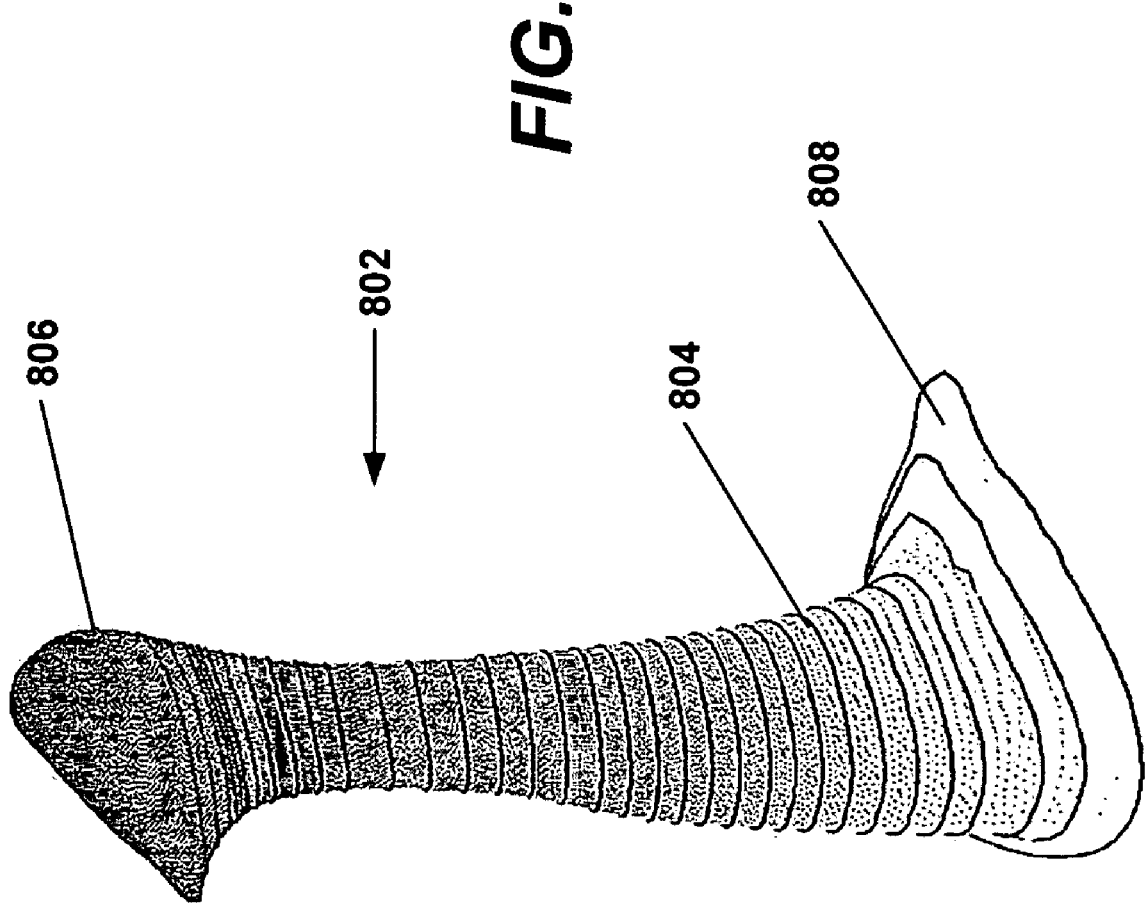
FIG. 8A shows a potential function evaluated on the skin surface of FIG. 2.

FIG. 8A shows an exemplary representation of the potential function evaluated on the skin surface 802 of the bird with equipotential lines 804. In FIG. 8A, the darker shading towards the top 806 of the bird's neck reflects larger values of the potential function compared with lower potential values near the bottom 808 of the bird's neck. Therefore, in an overall sense, the corresponding feather-ordering sequence 700 places feather elements on the skin surface 802 of the bird starting at the bottom 808 and proceeding to the top 806. FIG. 8B shows a corresponding exemplary representation of the potential function evaluated on the skin surface 806 with local gradient vectors 808.

Figure 29:
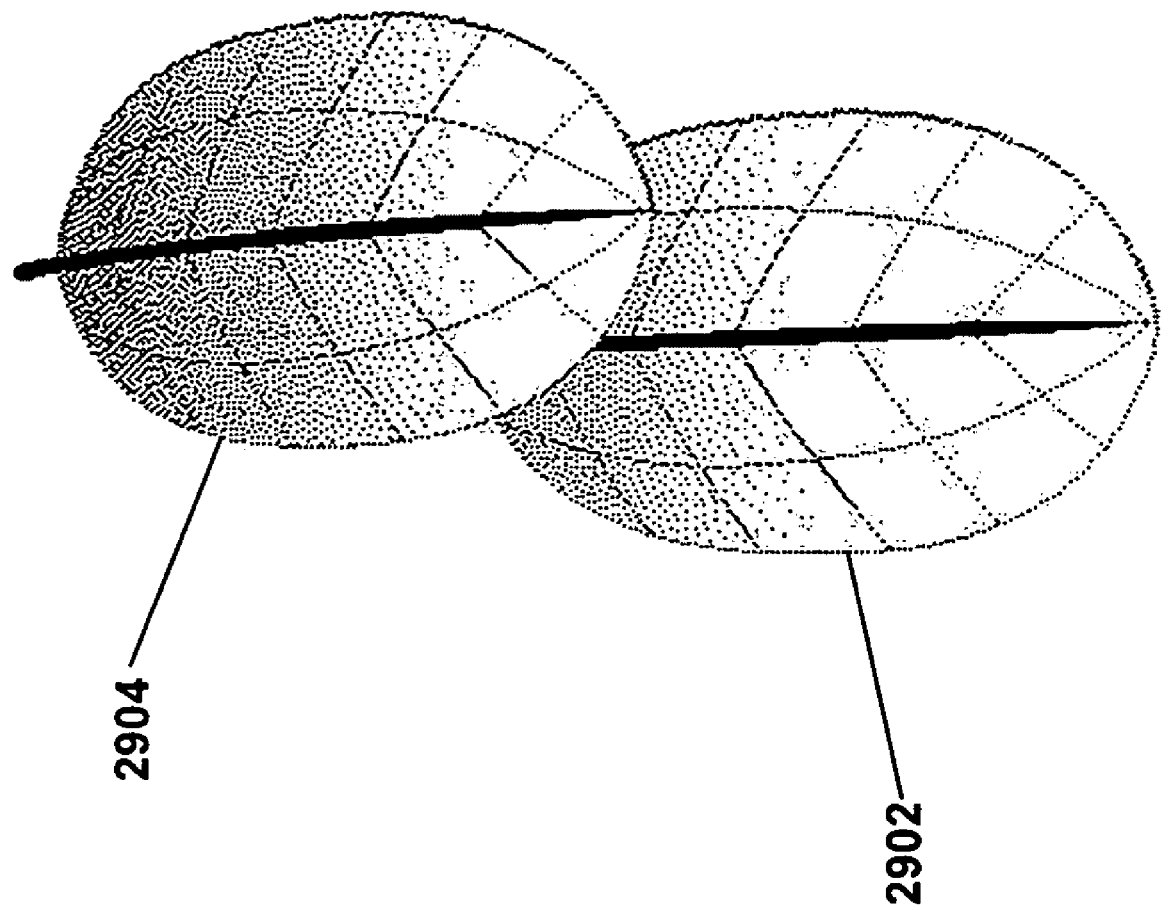
FIG. 29 shows a configuration of two exemplary feathers.
Figure 30:
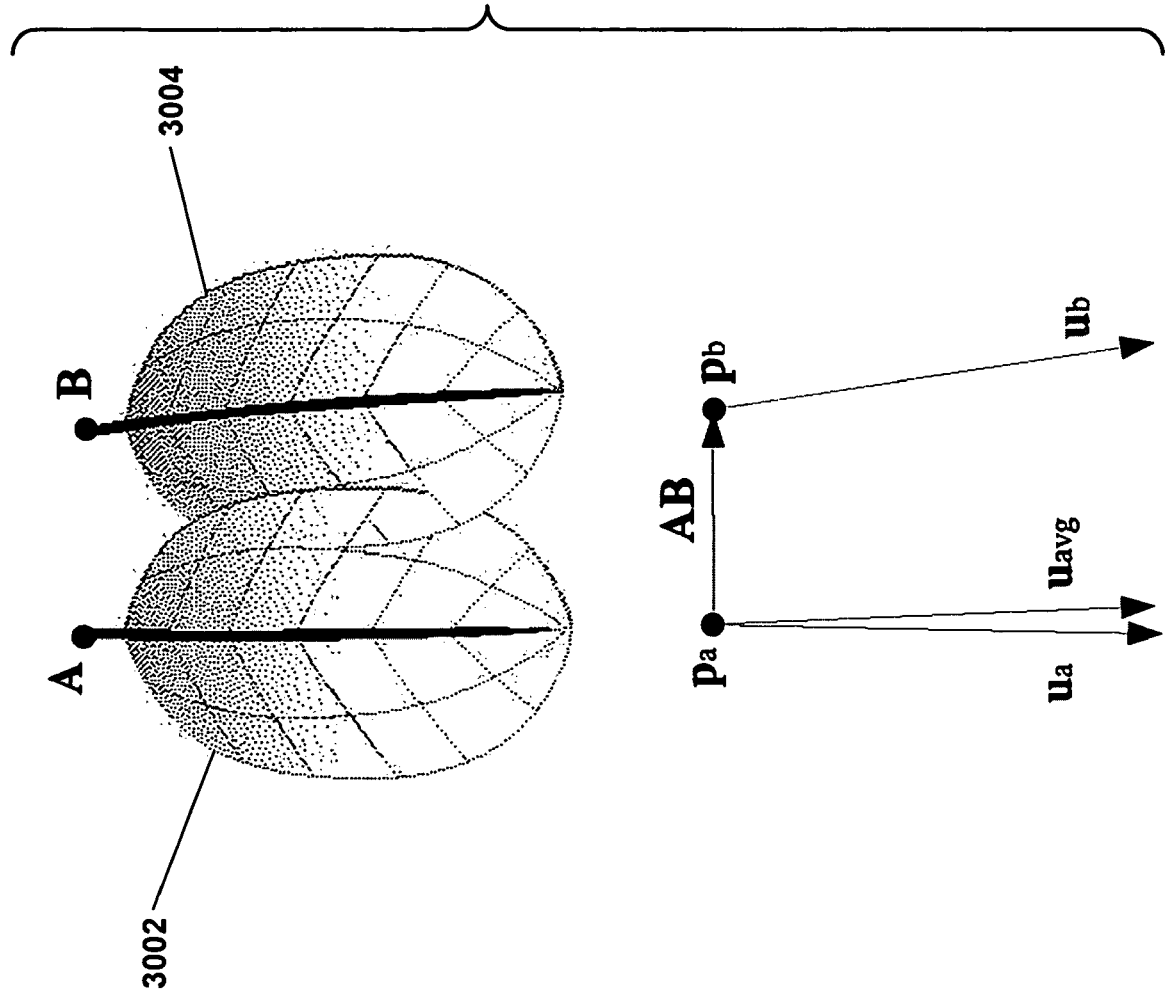
FIG. 30 shows a configuration of two exemplary feathers.
Figure 31:
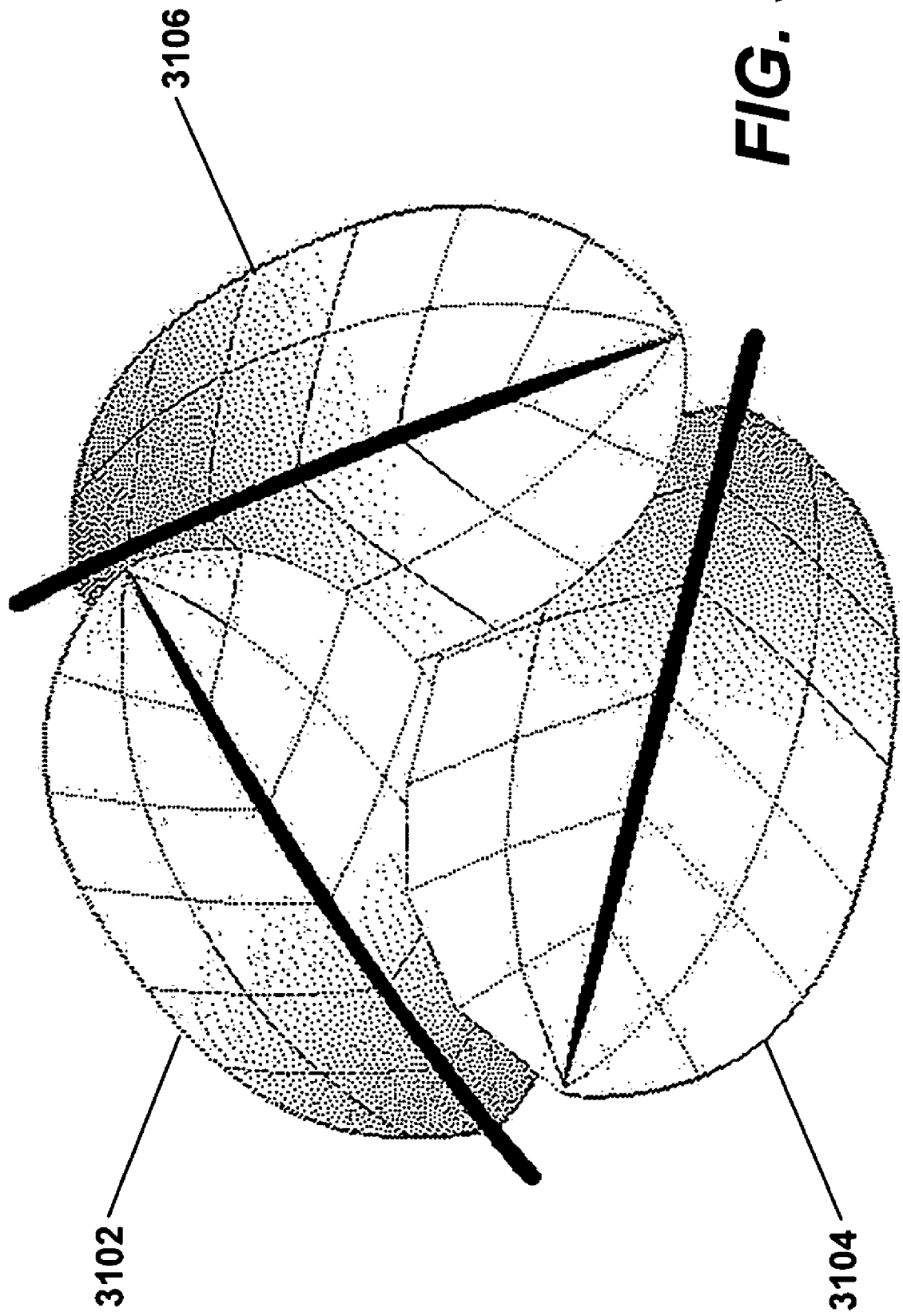
FIG. 31 shows a configuration of two exemplary feathers.
Figure 32:
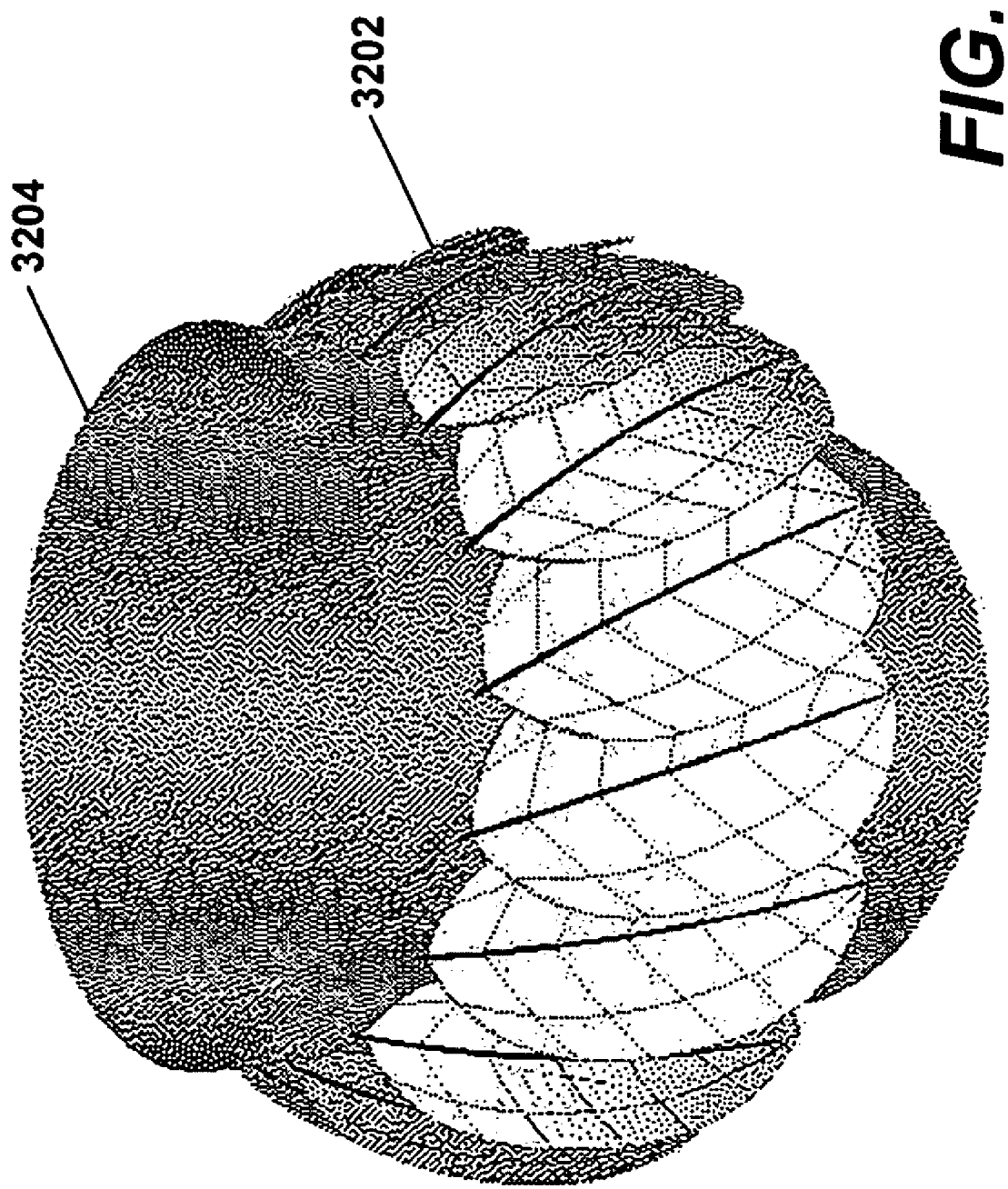
FIG. 32 shows a spiral configuration of multiple exemplary feathers.

In this way, the present invention enables the determination of a feather-ordering sequence 700 for attaching the feather elements 302 to the skin surface 202 in a natural way that is relatively stable across the animation sequence. As illustrated by FIGS. 29 and 30, this ordering desirably captures certain natural features of the underlying geometry, and, as illustrated by FIGS. 31 and 32, this ordering desirably avoids certain awkward or undesirable configurations.

FIG. 29 shows a simple configuration involving two feathers including a first feather 2902 and a second feather 2904. In this case, the first feather 2902 lies below the second feather 2904, and it seems natural to place the first feather 2902 before placing the second feather 2904 so that, with respect to their natural overlap, the second feather 2904 lies over the first feather 2902. FIG. 29 suggests a general heuristic for determining a natural layering order for placing a given set of feather elements on a skin surface. A natural layering order would be the sequence in which feathers could be placed starting with the bottommost feather and proceeding to topmost feather without having to tuck one feather beneath another. Sometimes such an ordering is obvious as in FIG. 29. However, as the number of feathers increases, more difficult situations are likely to arise as illustrated in FIG. 30.

FIG. 30 shows a more challenging configuration including feather A 3002 and feather B 3004. Related vectorial characterizations are also shown in FIG. 30. Feather A 3002 has a root at point $p_a$ and a combing-direction vector $u_a$, and Feather B 3004 has a root at point $p_b$ and a combing-direction vector $u_b$. The following pairwise ordering heuristic can be defined: Feather B 3004 must be placed before feather A 3002 if the following inequality holds $$0 < AB \cdot u_{avg} \tag{3}$$

where $$AB = p_b - p_a \tag{4}$$

and $$u_{avg} = \frac{(u_a + u_b)}{2}. \tag{5}$$

That is, feather B 3004 is placed first if its root is positioned further along the average combing-direction vector when compare with the root of feather A 3002. To apply this rule pairwise between any two feathers, a consistent solution encompassing all feathers must be developed from numerous neighboring feather comparisons. Furthermore, a consistent solution also requires that no cycle of feathers exist. FIG. 31 shows the simplest case cycle which can arise with only three feathers. A first feather 3102 lies below a second feather 3104, and the second feather 3104 lies below a third feather 3106. However, the first feather 3102 does not lie below the third feather 3106, and so there is no consistent ordering of the feathers. That is, it is not possible to place the feathers 3102, 3104, 3106 sequentially so that a later-placed feather can be placed above previously placed feathers. More complex cycles are also possible as illustrated in FIG. 32 where the feathers 3202 cycle around a cylindrical structure 3204 that represents the neck of a bird. In these cases, a later-placed feather (e.g., the third 3106) feather must be tucked under a previously place feather (e.g., the first feather 3102), thereby creating some awkwardness in the animation process.

The above-described method 702 where a feather-ordering function 708 is derived from an integrable vector field 708 incorporates aspect of the heuristic illustrated by FIGS. 29 and 30 while avoiding the potentially awkward feather orderings illustrated by FIGS. 31 and 32. The right-hand side of the ordering heuristic in Eq. 3 can be considered as an element of a discrete approximation of the traditional line integral of a vector field along a curve (*Calculus III*, H. Marsdan and A. Weinstein, Springer-Verlag (New York, 1985), p. 896):

$$\int_c u(x) \cdot dx. \tag{6}$$

Furthermore, a cycle of feathers corresponds to an approximation of this integral for a closed curve where all the approximation elements are positive (i.e., nonzero) thereby corresponding to a non-integrable vector field (i.e., a vector field with nonzero curl). By extracting an integrable vector field as the feather-ordering vector field 706, a natural ordering related to the combing direction can be extracted while avoiding undesirable cycling.

Preferably the feather-ordering vector field 706 preserves the directional properties of the initial vector field 704 as much as possible since this reflects the orientation of the feather elements 302 (e.g., the "combing" direction) in the rest pose 502. According to one exemplary method, one can adjust the magnitudes of the vectors in the initial vector field 704 (not the directions) in order to provide an integrable feather-ordering vector field 706. Given a user-created continuous non-zero direction field u(x) defined on a surface mesh M, we seek a scalar potential function Φ(x), related to the velocity field by:

$$u = \nabla \Phi_0. \tag{7}$$

As discussed above, the above equation can only be satisfied exactly for an irrotational vector field, which is certainly unlikely in the case where u was created by a human in order to meet an artistic aesthetic. According to the Helmholtz-Hodge theorem, a vector field can be decomposed into an irrotational component represented by the gradient of a potential, and an additional rotational component that is represented as the curl of a stream function ("Discrete Multiscale Vector Field Decomposition", Y. Tong, S. Lobeyda, A. Hirani, and M. Desbrun, ACM Transactions in Graphics, vol. 22, Issue 3, July 2003 (6 pages)):

$$u = \nabla \Phi_0 + \nabla \times \Psi_0. \tag{8}$$

In many cases, however, the direction of $\nabla \Phi$ by this construction will not align sufficiently with the vector field u for the appropriate visual effect. However, in this formulation the vector magnitude can be considered as a free variable since the vector direction is the relevant user design input for determining the orientation of the feathers. Allowing the magnitude scalar field $\alpha(x)$ to be an additional degree of freedom enables us to envision a velocity field that retains the original direction, but minimizes vorticity. Introducing a yields:

$$\alpha \hat{u} = \nabla \Phi + \nabla \times \Psi, \tag{9}$$

$$\hat{u} = u/\|u\|. \tag{10}$$

Normalizing by $\alpha$ yields:

$$\hat{u} = \frac{\nabla \Phi}{\alpha} + \frac{\nabla \times \Psi}{\alpha}. \tag{11}$$

Then using $\alpha(x)$ to minimize the residual rotational and harmonic term $$\frac{\nabla \times \Psi}{\alpha}$$

allows us to find a desirable potential field in the sense that the orientations are preserved as much as possible. Since we seek $\Phi$, and were given u we write the following normalized quadratic energy functional that minimizes the error term in a least squares sense:

$$E(\Phi, \alpha) = \int \left(\frac{\nabla \Phi}{\alpha} - \hat{u}\right)^2 dx. \tag{12}$$

Integrating the energy along the edges e of our surface mesh leads to the discrete integral representation:

$$E(\Phi, \alpha) = \sum_{edges_{e=(i,j)}} \left(\frac{\Phi_j - \Phi_i}{\alpha_e} - \hat{u} \cdot e\right)^2. \tag{13}$$

This energy functional lends itself well to minimization by discrete optimization methods such as multidimensional conjugate gradient since E is analytically differentiable with respect to all degrees of freedom ($\Phi_1, \Phi_2, \ldots, \Phi_n, \alpha_1, \alpha_2, \ldots, \alpha_m$). (*Practical Methods of Optimization* (2nd edition), R. Fletcher, John Wiley & Sons (1987), pp. 80-87.) FIGS. 8A and 8B illustrate a potential function that was derived according to this approach.

Figure 9:
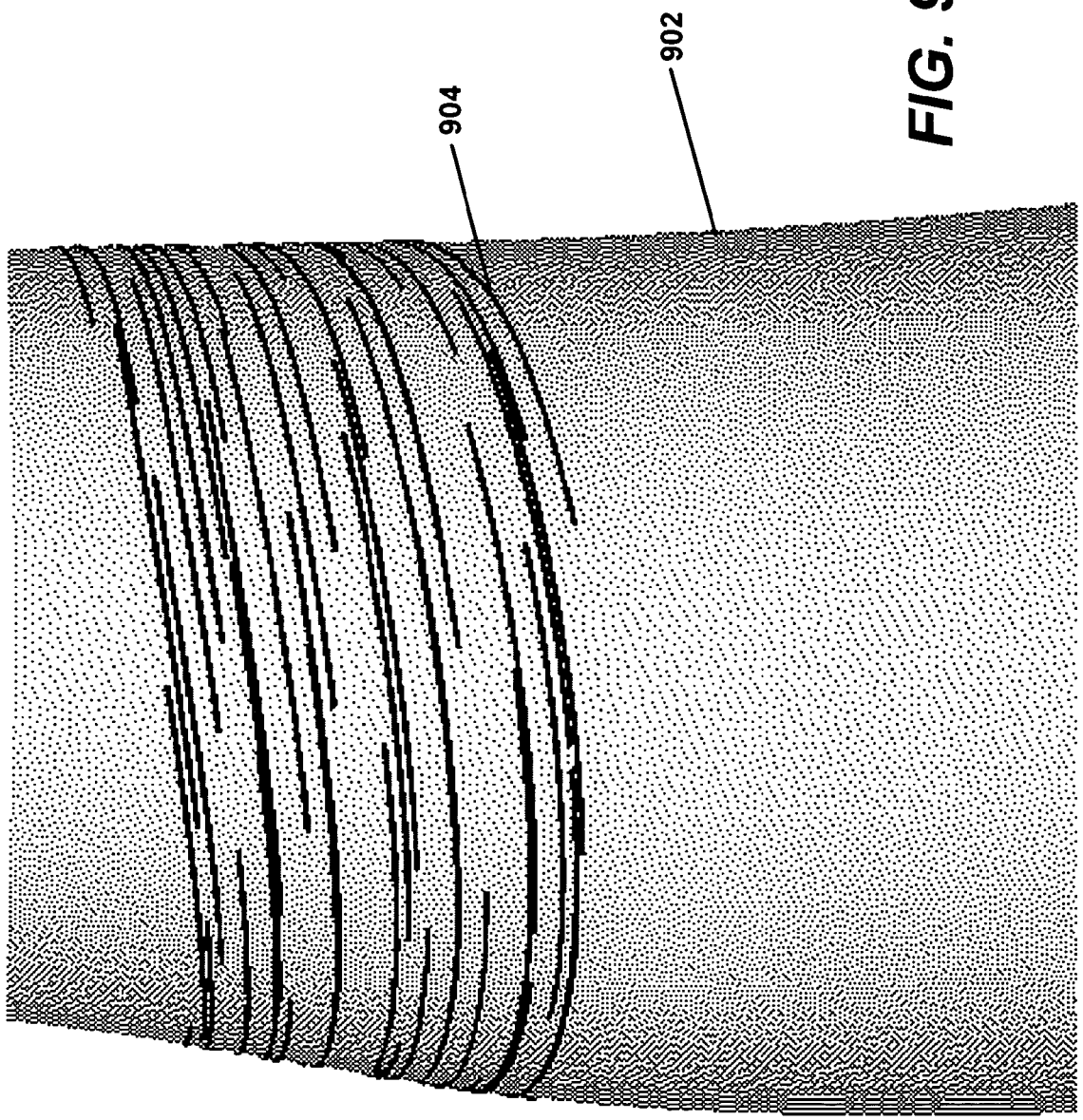
FIG. 9 shows feather-proxy placement curves on the skin surface of FIG. 2.

As shown in FIG. 7, the feather-ordering function 708 also enables the determination of related feather-proxy placement curves 710. Continuing with the example for the bird's neck in FIGS. 8A and 8B, FIG. 9 shows the skin surface 902 with feather-proxy placement curves 904 corresponding to the feather elements 302. The feather-proxy placement curves provide extensions of the root-attachment points 310 on the skin surface 202 for the feather elements 302. For embodiment shown in FIG. 9, the feather-proxy placement curves 904 were constructed by extending the root-attachment points 310 along equipotential lines of the potential function $\phi(x,y)$ (i.e., the feather-ordering function 708) approximately one feather-element's width in either direction. That is, the midpoint of one of the feather-proxy placement curves 904 corresponds to a root-attachment point 310, and the length of the curve 904 is approximately twice the width of a feather element 302. As discussed below in greater detail, these extensions allow the animation process to avoid intersections and other undesirable interactions between the feather elements 302.

Figure 10:
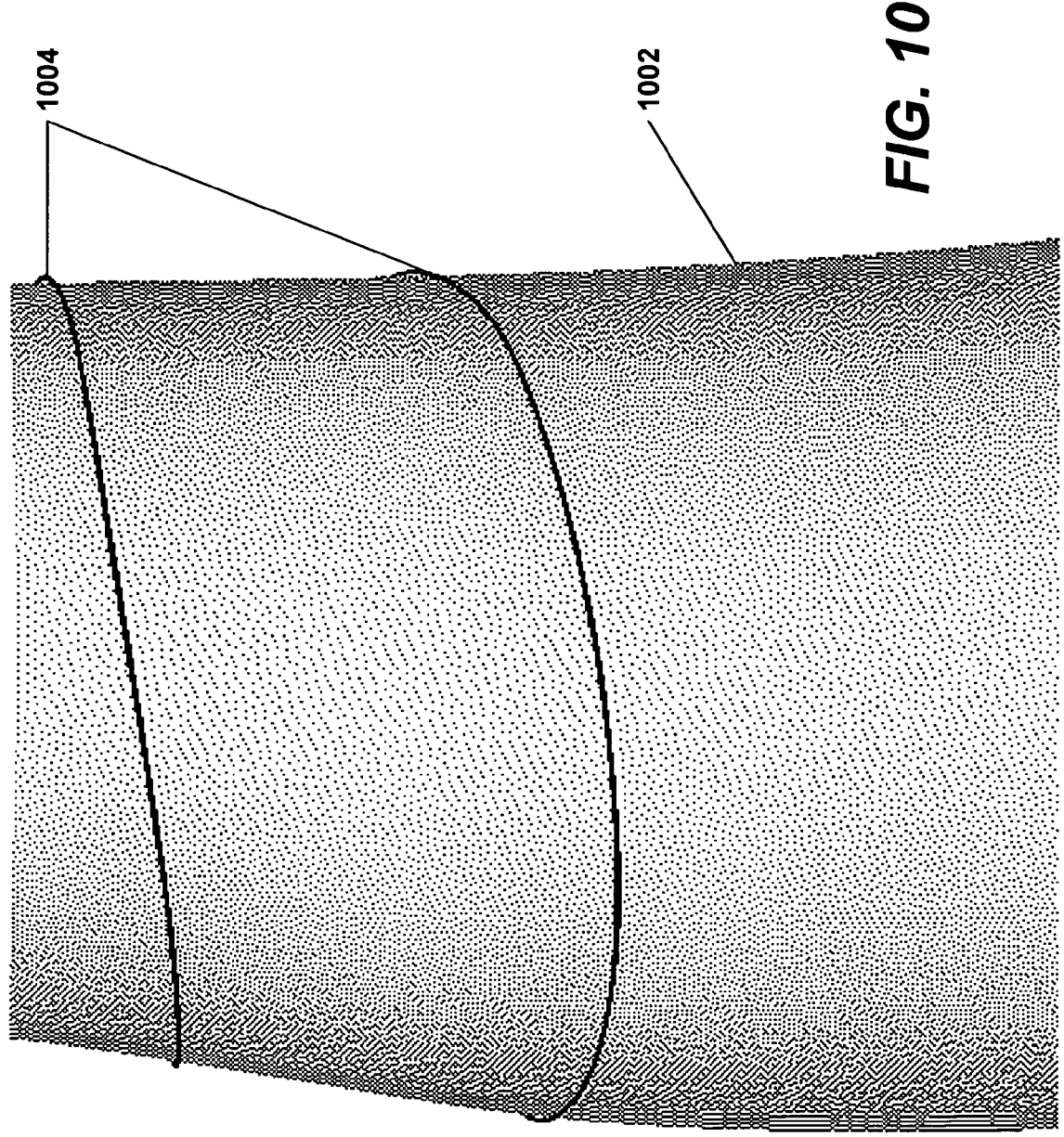
FIG. 10 shows skirt-placement curves on the skin surface of FIG. 2.

As shown in FIG. 7, the feather-ordering function 708 also enables the determination of a skirt-ordering sequence 712 and related skirt-placement curves on the skin surface 714. Thus, the potential function $\phi(x,y)$ can also be used to define additional collision-avoidance elements known as "skirts." FIG. 10 shows the skin surface 1002 with exemplary skirt-placement curves 1004 defined over the skin surface 1002, where each curve 1004 is an equipotential line of the potential function $\phi(x,y)$ and the separation between curves 1004 is approximately the average overlap in the direction of the shaft (e.g., from root 308 to tip 312) of a feather element 302 (e.g., perhaps half the average length of the shaft). Since each curve 1004 is an equipotential line, the corresponding values can be ordered from lowest to highest to determine a skirt-ordering sequence (i.e., $s_1 \leq s_2 \leq s_3 \leq \ldots \leq s_n$) that is similar to the feather-ordering sequence described above.

It should be noted that although a potential function $\phi(x,y)$ was used in to determine the feather-ordering sequence 700, the feather-proxy-placement curves 710, the skirt-ordering sequence 712, and the skirt-placement curves 714 for the embodiment described above, these entities can be determined by alternative approaches including arbitrary construction combined with trial and error to avoid intersections among the feather elements 302.

Figure 11:
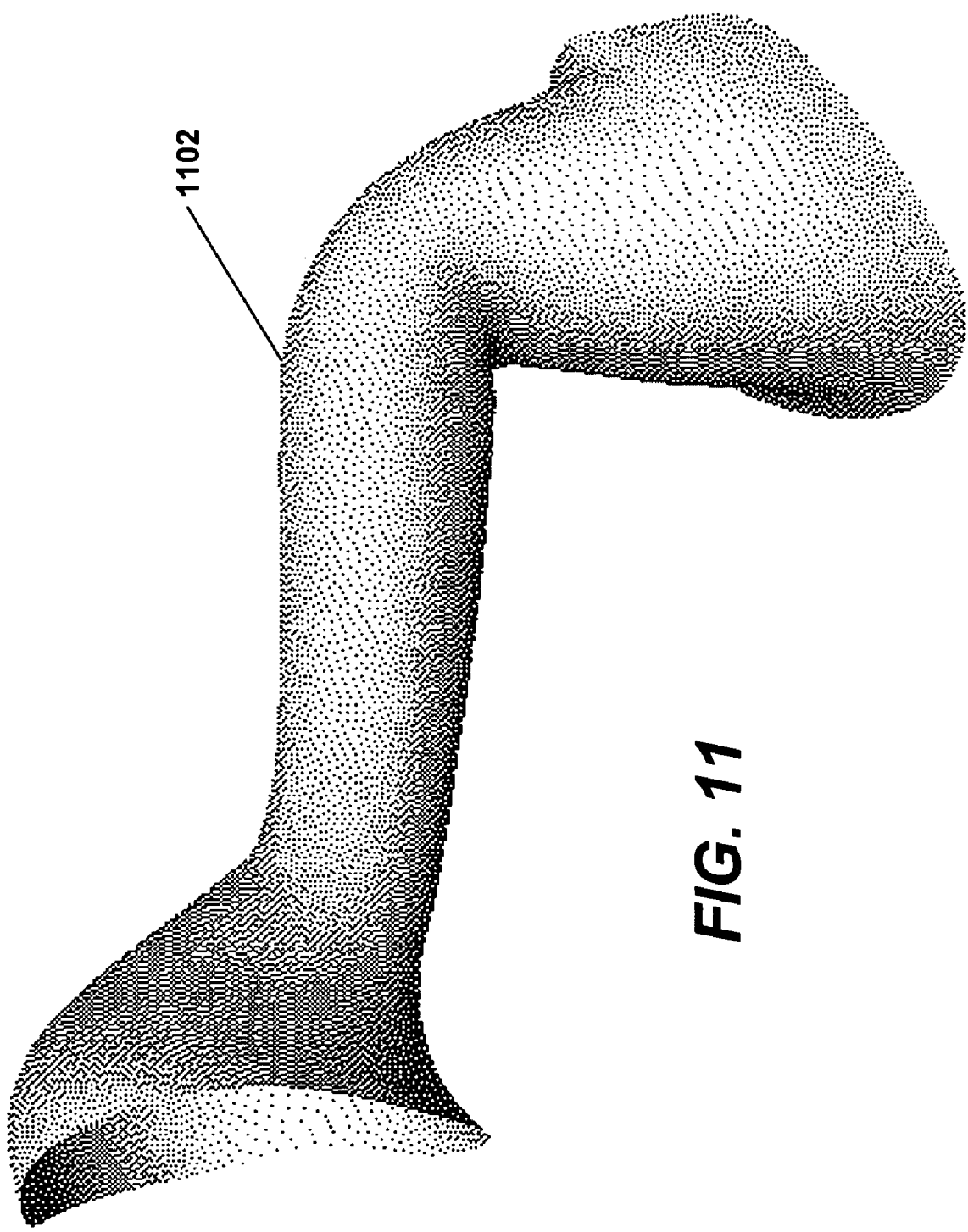
FIG. 11 shows the skin surface of FIG. 2 at an animated time, where the neck of the bird is bent forward.

After the initial setup 104, the animation can be developed to an arbitrary animated time 106. First, positions for the skin surface 112 are determined by animating the skin surface from the initial state 108 (e.g., by conventional animation techniques). (*Computer Graphics: Principles and Practice* (2nd ed.), J. Foley, A. van Dam, S. Feiner, and J. Hughes, Addison-Wesley, 1990) FIG. 11 shows the skin surface 1102 at the animated time 106, where the neck of the bird is bent forward.

Figure 12:
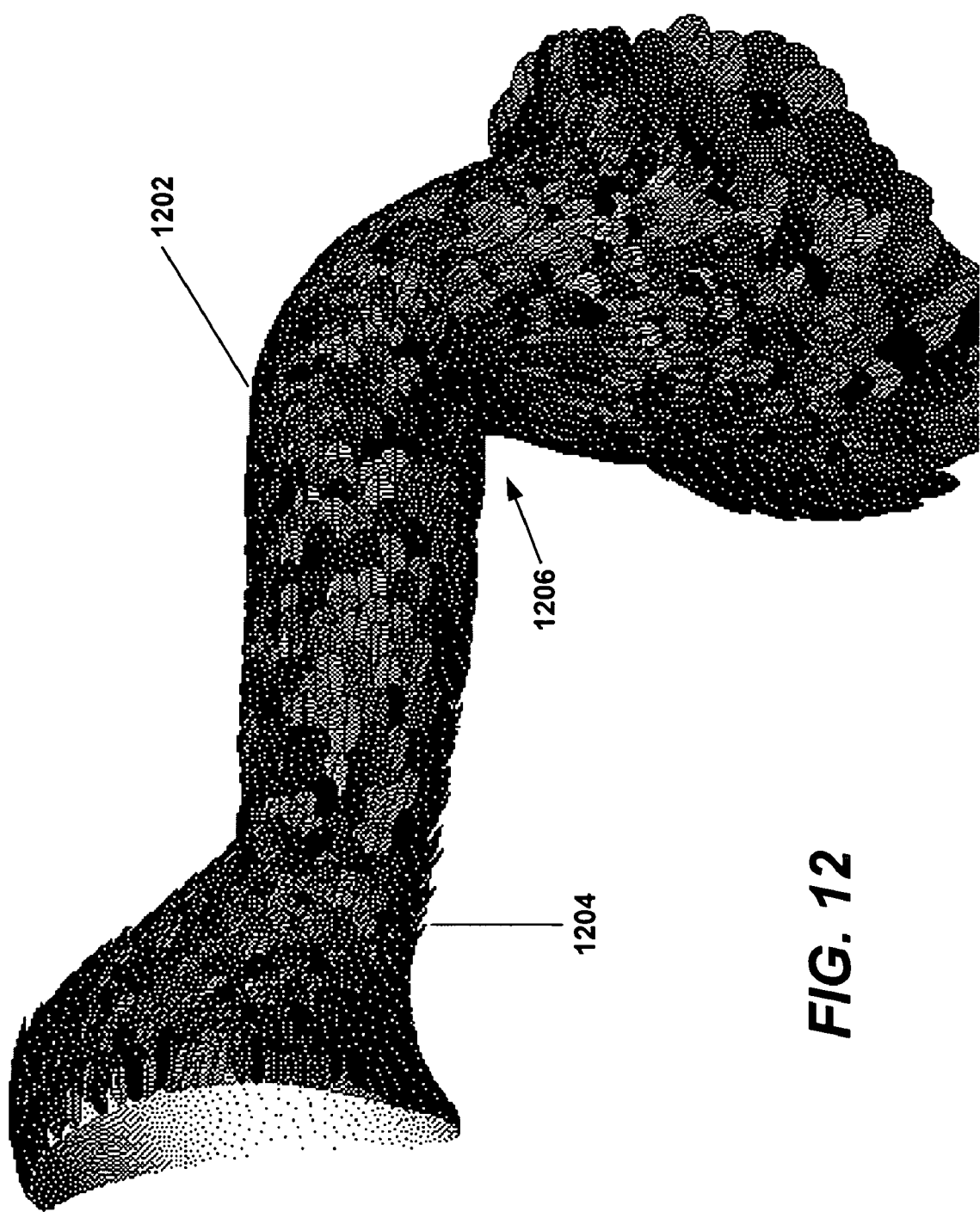
FIG. 12 shows the skin surface of FIG. 11 with attached feather-element projections.
Figure 13:
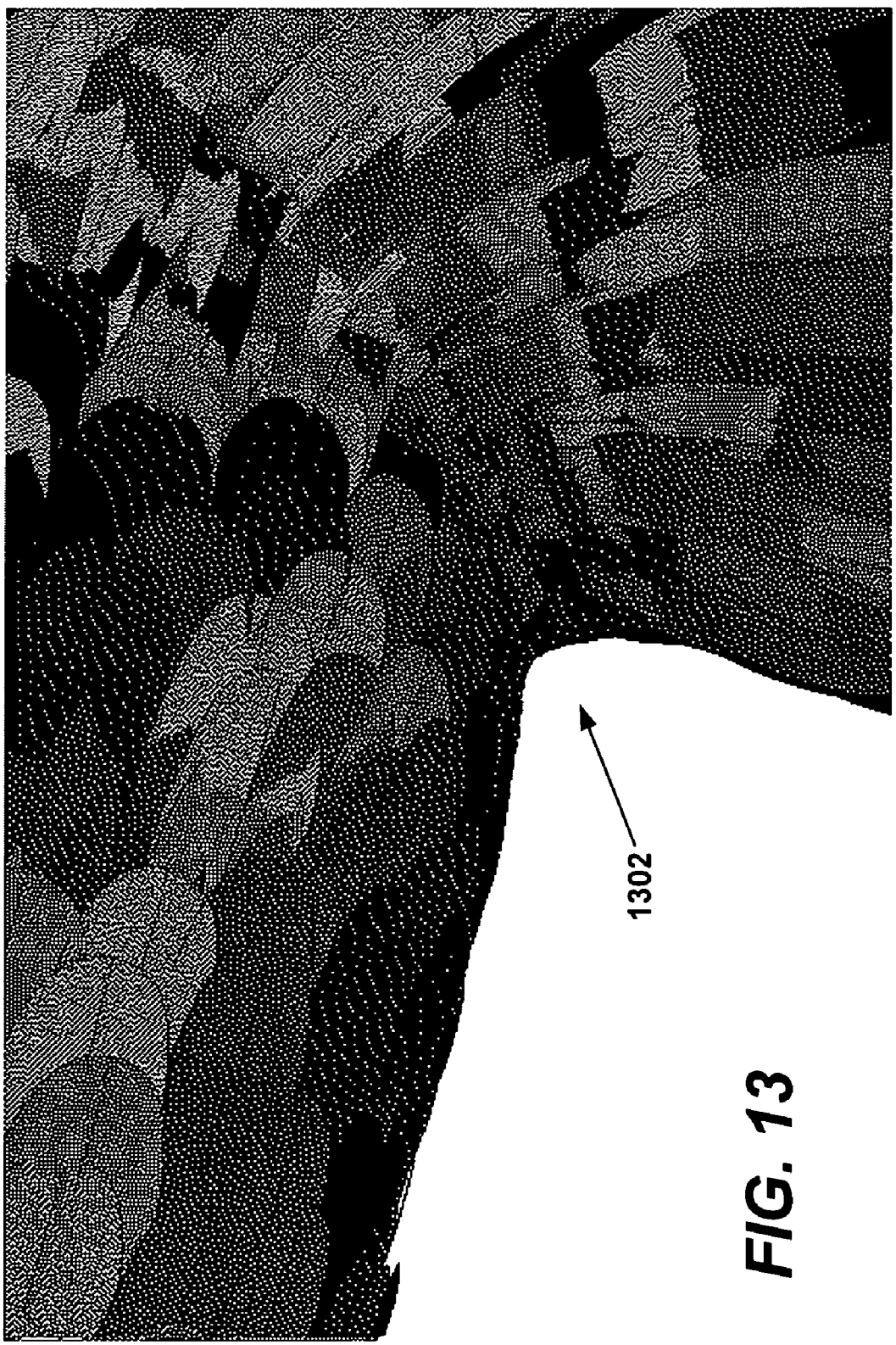
FIG. 13 shows a focus of the skin surface of FIG. 12 that highlights the bend of the neck.
Figure 14:
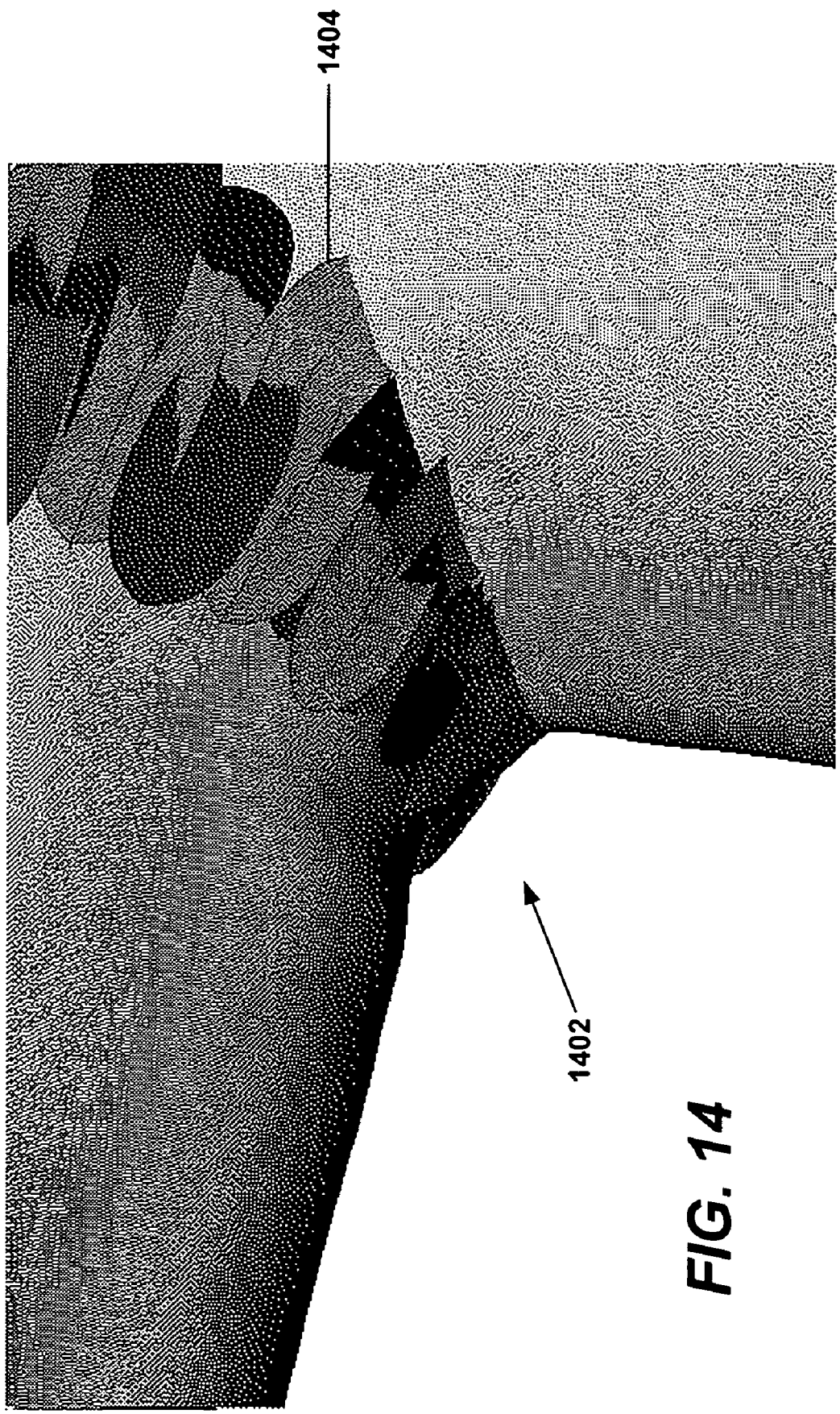
FIG. 14 shows the focus of FIG. 13 with relatively few feather element projections.

Similarly positions for feather-elements projections can be determined by animating the feather elements from the initial state 108 without avoiding undesirable intersections between the feather elements. That is, the feather-element projections can be determined by animating the feather elements 302 independently of one another using conventional techniques. FIG. 12 shows the skin surface 1202 with attached feather-element projections 1204 at the animated time 106. FIG. 12 also shows a focus 1206 on the bend of the neck where intersections between the feather element projections 1204 are most severe. FIG. 13 shows a similar focus 1302 that highlights the bend of the neck, and FIG. 14 shows the focus 1402 with relatively few feather element projections 1404 to illustrate the intersection problems that arise from the conventional animation techniques. As discussed below, the present invention is directed towards avoiding these undesirable intersection, and the feather-element projections 1404 can be used as part of the solution process for some embodiments of the present invention.

It should be noted that, in many operational settings, positions of animated elements are simply specified as inputs for the processes of the present invention. Therefore, the details of these animation processes (e.g., for determining the skin surface 1102 and the feather-element projections 1204 at the animated time 106) are not discussed in detail here.

Figure 15:
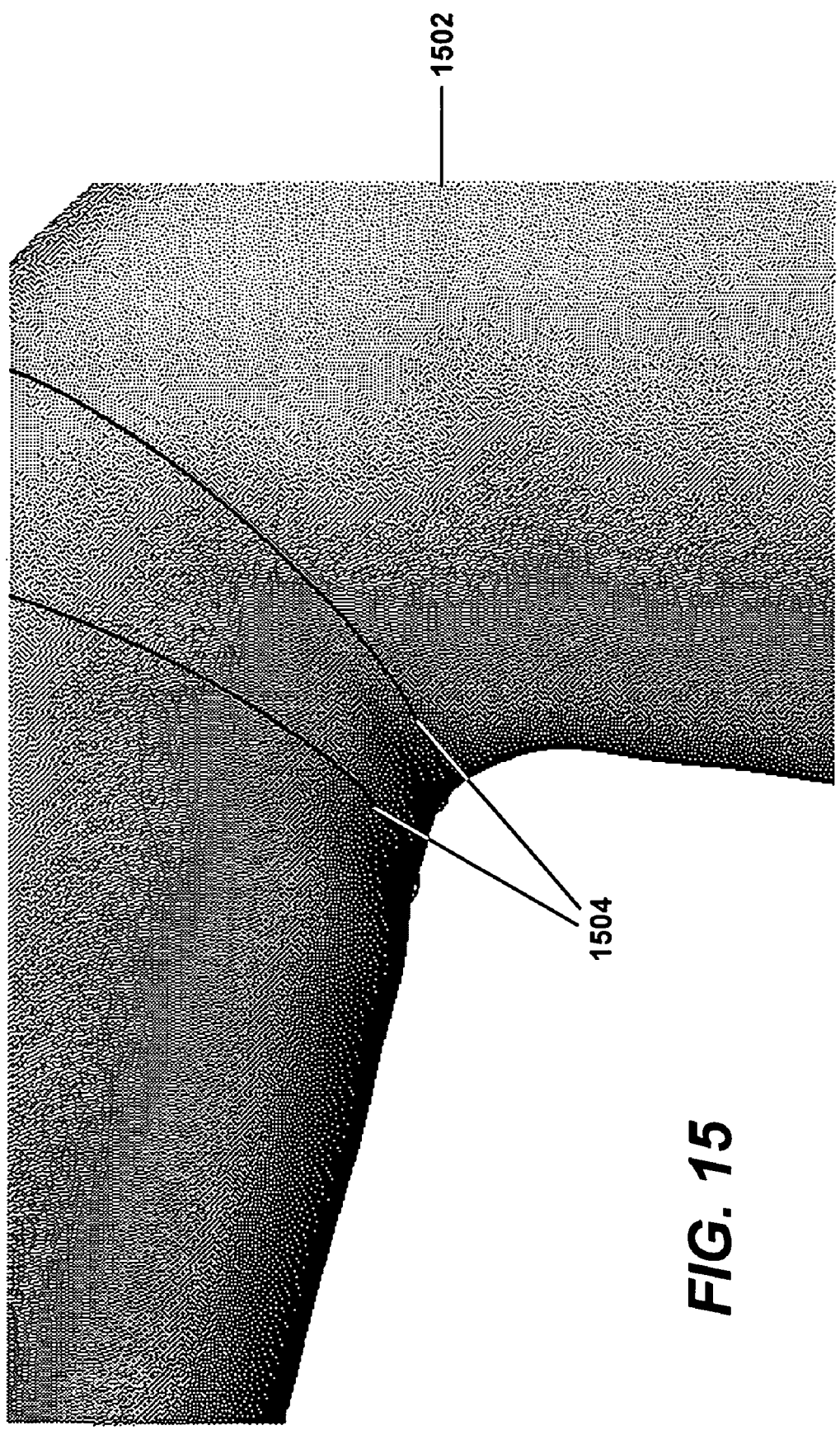
FIG. 15 shows the skin surface of FIG. 11 with skirt placement curves.
Figure 16:
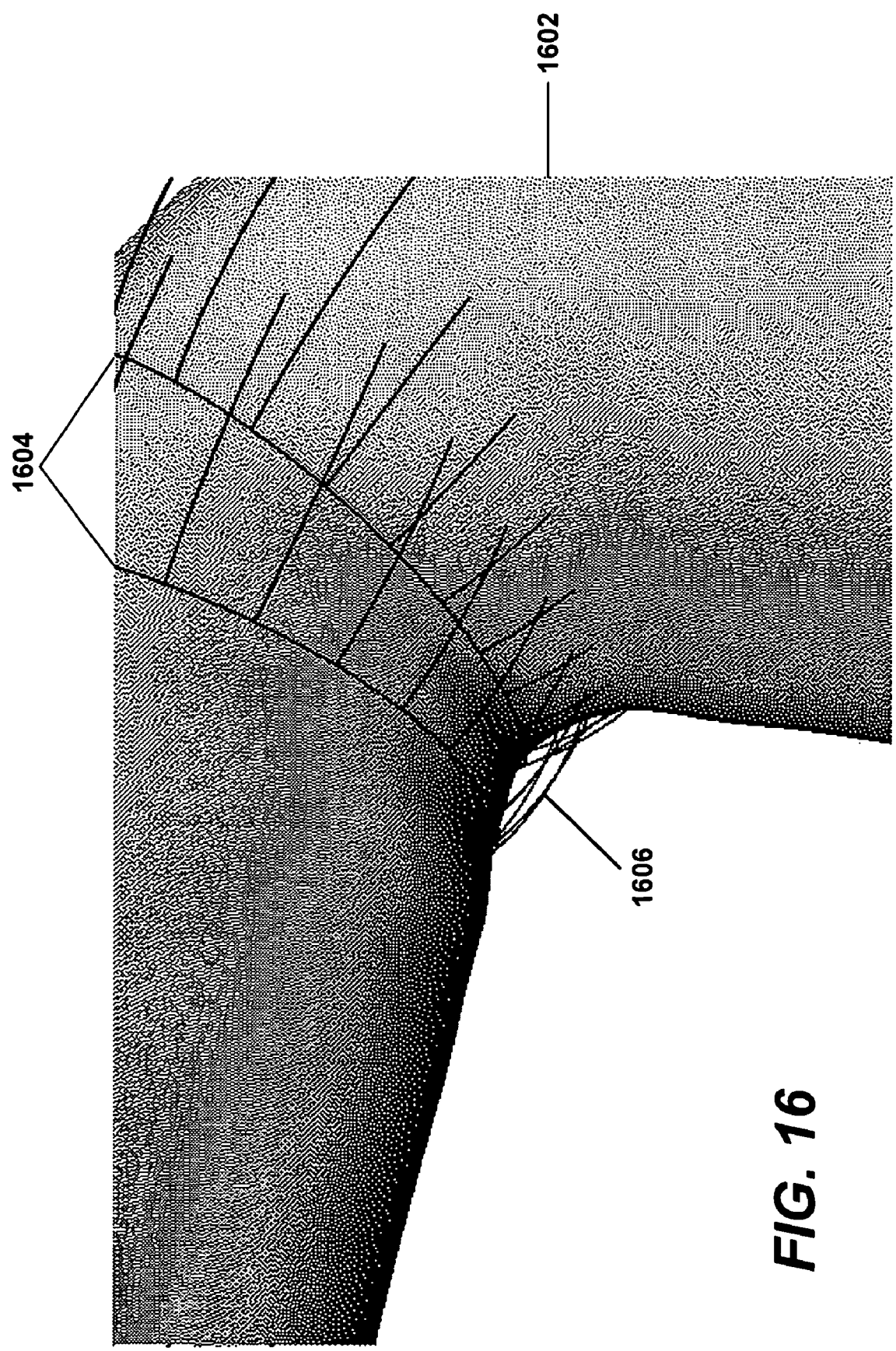
FIG. 16 shows the skin surface of FIG. 15 with skirt-placement curves and skirt shafts.

After the skin surface 112 has been determined, positions for skirt elements 114 are determined for providing spatial extensions of the skin surface 112 at the animated time 106. Following the focus 1402 for the animated skin surface and projected feather elements at the animated time 106, FIG. 15 shows the skin surface 1502 with the skirt placement curves 1504 at the animated time 106 where these curves 1504 have been animated from the initial curves 1004 in the initial setup of the skin surface 1002. FIG. 16 shows the skin surface 1602 with the skirt-placement curves 1604 and skirt shafts 1606 that extend outwardly from the curves 1604. Typically, these skirt shafts 1606, which may be thought of as pseudo-feathers, can be interpolated from shafts of nearby feather-element projections 1404. The lengths of the shafts 1606 are typically somewhat larger (e.g., 10-20%) than the length of the feather elements in order to protect against interpenetration. As illustrated in FIG. 16, several of the shafts 1606 visibly penetrate (i.e., intersect) the skin surface.

Figure 17:
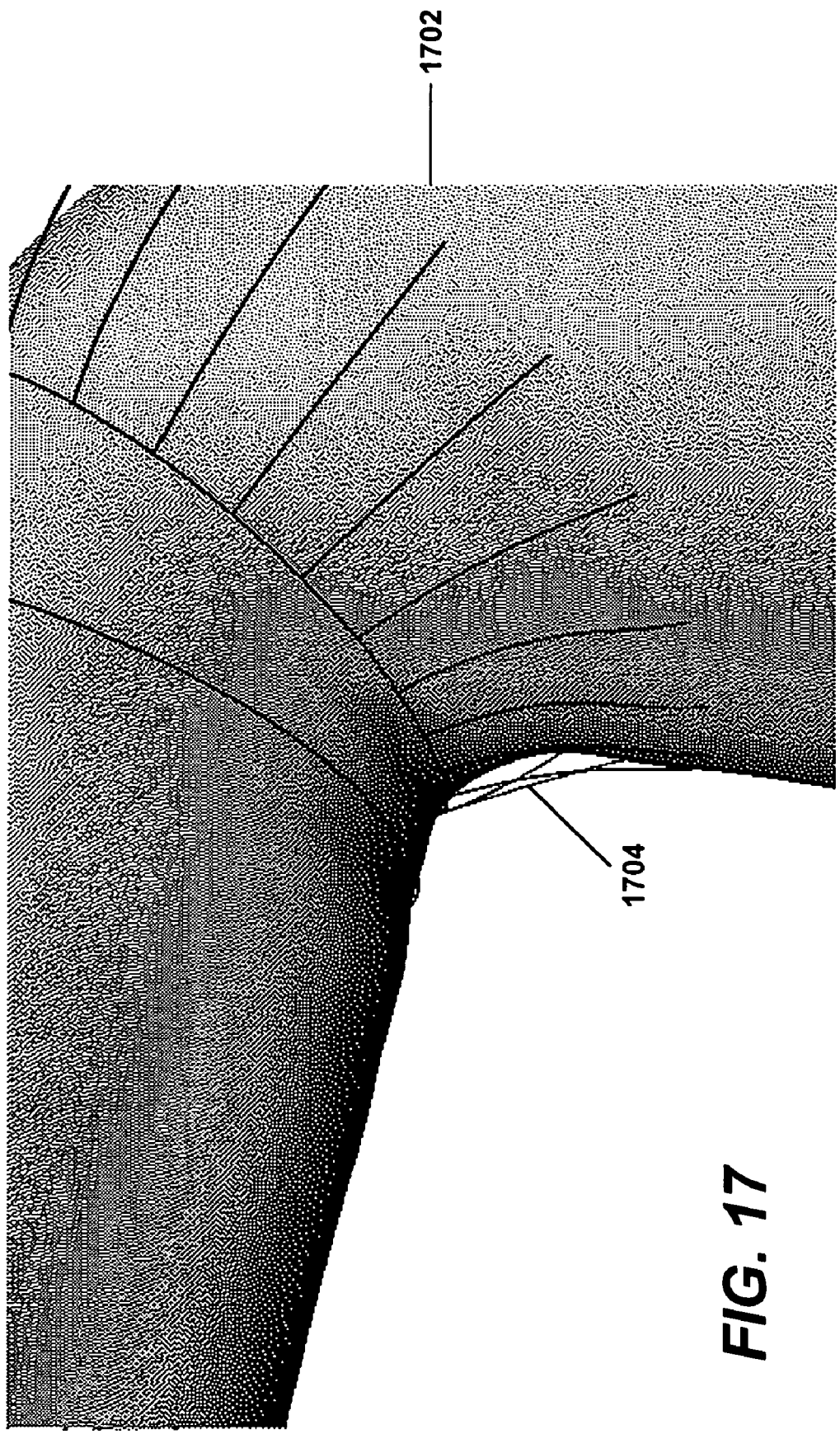
FIG. 17 shows the skin surface of FIG. 16 where the shafts for the first skirt element have been deformed (or lifted) to avoid collisions.

Next, the skirt elements 114 are constructed for each skirt-placement curve 1504 according to the skirt ordering sequence described above (e.g., beginning with the curve 1504 with the lowest potential value). FIG. 17 shows the skin surface 1702 where the shafts 1704 for the first skirt element have been deformed (or lifted) from the skin surface. A variety of modeling tools can be used for this purpose including, for example, a beam that is deformed by applied forces (e.g., a cantilevered beam deformed by transverse loads as one specific example). In some implementations, specific control points of the shafts 1704 can be adjusted to avoid intersections with the skin surface at those points.

According to one exemplary embodiment, deforming the shaft 1704 of a skirt is accomplished by finding a function that satisfies a set of possible positional constraints determined at discrete points along the shaft. Constraints used in the bending are first found by casting rays to test for collisions with neighboring geometry. Then the deformed shaft is determined based on the superposition method for combined loadings of an elastically deforming beam. (*Introduction to Mechanics of Materials*, W. Riley and L. Zachary, John Wiley and Sons, Inc. (1989).) The superposition technique solves for the deformation of a beam by linearly combining a set of simple, apriori determined bending solutions. Typically, the simple solutions (hereafter called the basis functions) are found independently of one another for various simplistic force loading situations. Typically, al basis function is expressed as a piecewise polynomial function in Cartesian coordinates and is valid at least for small deformations.

Figure 33:
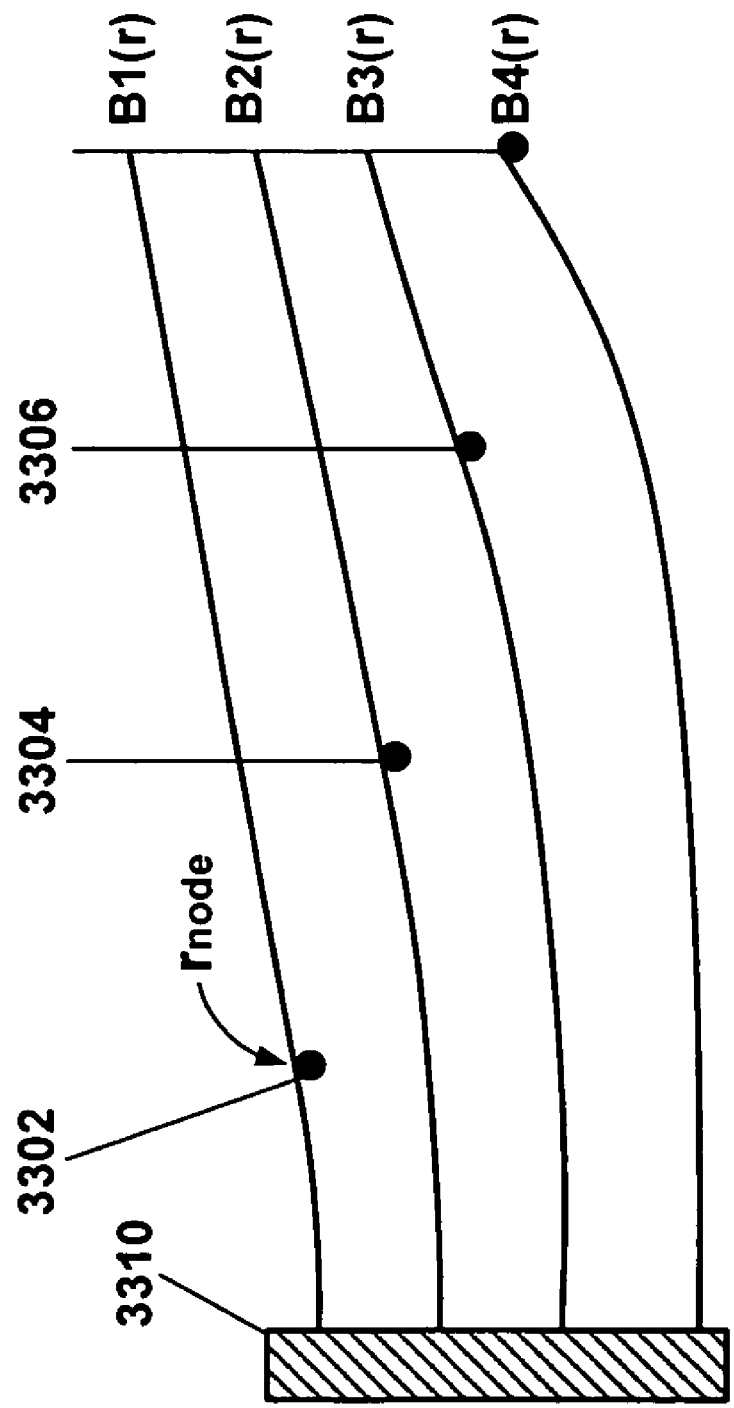
FIG. 33 shows exemplary basis functions for modeling the deformation of a shaft element as a cantilevered beam.

For this embodiment we employ polar coordinates to express the deformation as a rotation that is a function of radial distance. FIG. 33 shows four polar-coordinate basis functions ($B_1(r)$, $B_2(r)$ $B_3(r)$ $B_4(r)$), where the circles 3302, 3304, 3306, 3308 indicate the radial locations (or nodes $r_{node}$) where a force is applied to the beam. Conceptually, the shaft is divided into a discrete set of segments with a node at the end of each segment. The rotation as a function of radial distance from the attachment point 3310 is given by:

$$B(r) = \begin{cases} C\dfrac{r}{r_{node}}, & 0 < r < r_{node} \\ C, & r_{node} < r. \end{cases} \quad (14)$$

In this definition the constant C is chosen to normalize the displacement. The term is also analogous to EI, Young's modulus times the moment of inertia, that relates the magnitude of deformation of a beam to the force applied. For a give set of weights $w_i$, a deformation is modeled by the formula:

$$d(r) = \sum_i w_i B_i(r). \quad (15)$$

Figure 34:
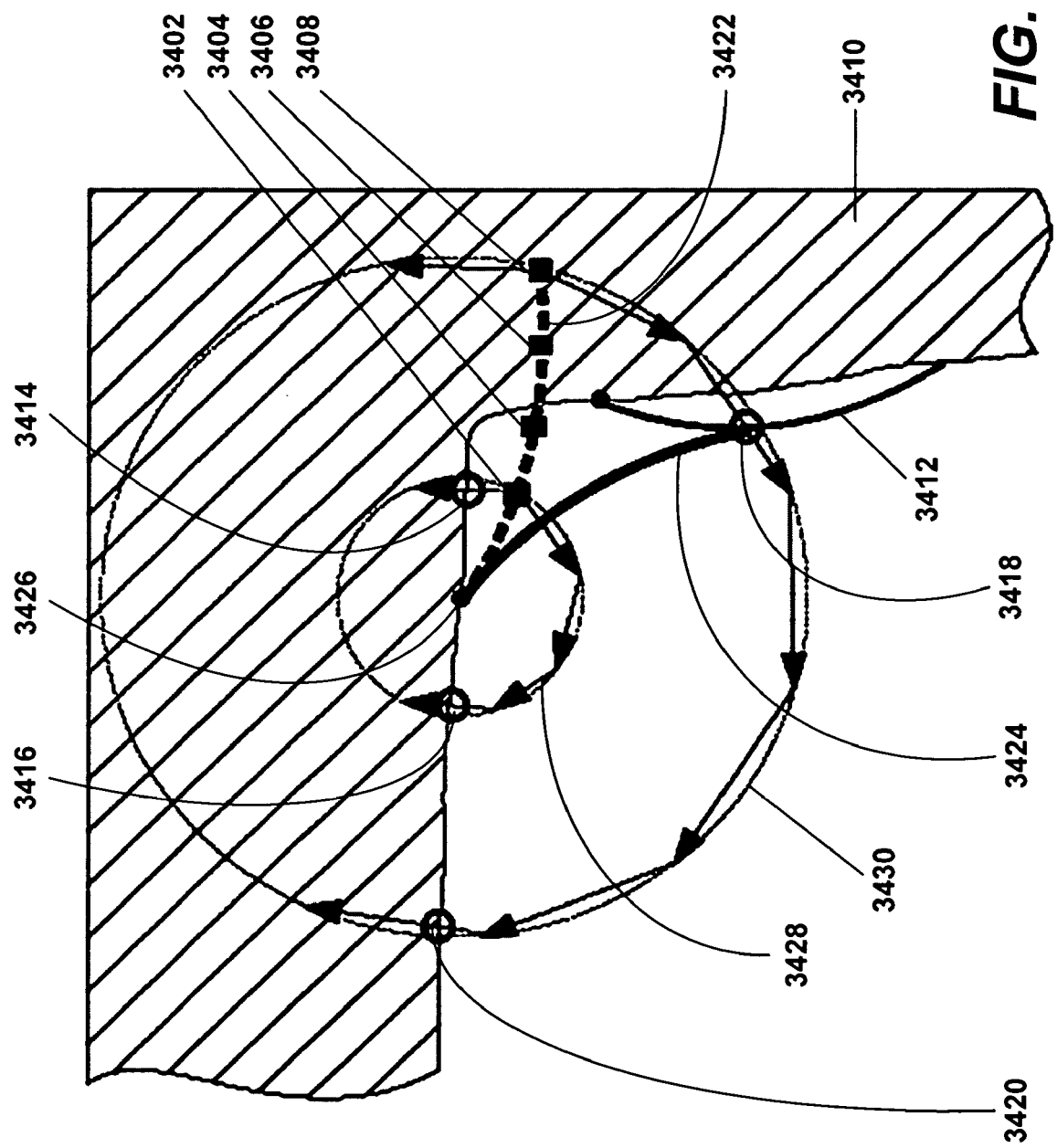
FIG. 34 shows an exemplary representation of collision detection and related constraints for a shaft element.

Next constraints can be imposed at the nodes 3302, 3304, 3306, 3308 at their respective boundaries. FIG. 34 shows the nodes 3402, 3404, 3406, 3408 constrained by a skin surface 3410 and a previously placed barrier (e.g., skirt element or a feather-proxy element) 3412. An initial shaft position 3422 and a (final) deformed shaft position 3424 are shown together with a fixed root-attachment point 3426. The shafts 3422 deform axially about the root skin attachment point 3426 as a linear function in polar coordinates of radial distance: d (r). Consequently, for each node 3402, 3404, 3406, 3408 of the shaft we cast ray segments 3428, 3430 about the circle of all possible positions about the shafts axis of rotation. Collisions of the rays with other geometry elements in the scene determine the position constraints (limits) for that point of the shaft. FIG. 34 depicts the ray casting for two nodes 3402, 3404 of a shaft 3422. Two constraints are typically found for each node i, including a lower bound $\Theta_{i_{min}}$ and an upper bound $\Theta_{i_{max}}$ that are measured relative to the displacement at that node:

$$\Theta_{i_{min}} \leq d(r_i) \leq \Theta_{i_{max}}. \quad (16)$$

Constraints are shown for the first node 3402 and the fourth node 2408. The first node 3402 can be deformed to lie between a first constraint 3414 and a second constraint 3416, where the arrows show the directions of the corresponding forces when starting from the initial position 3422. Similarly the fourth node 3404 can be deformed to lie between a first constraint 3412 and a second constraint 3414. Note that the first constraint 3418 of the fourth node 3408 lies on the barrier 3412 while the other constraints 3414, 3416, 3420 lie on the skin surface 3410. The deformed shaft position 3424 represents the solution obtained by imposing nodal constraints on the functional form given by Eq. 15. Note that it is possible to speed up the process of checking for intersections with previously placed barriers 3412 since for example, a skirt element is typically constructed to lie above all previously placed skirt elements as well as the skin surface. Therefore, skirt elements can be checked in sequence for a node 3402, 3404, 3406, 3408 until the first intersection is discovered.

From the functional form given by Eq. 15 and the constraints given by Eq. 16, one can determine suitable weights $w_i$ by calculating one or more feasible solutions of the corresponding linear programming problem (e.g., by the Simplex method). (*Numerical Recipes in C*, W. H. Press, B. P. Flannery, S. A. Teukolsky, and W. T. Vetterling, Cambridge University Press (1988), pp. 329-343.) Since multiple solutions are possible, additional constraints can be imposed to visually enhance the results, either by adding additional constraints or defining an optimization criterion for the linear programming problem. (Of course, nonlinear constraints or a nonlinear optimization criterion could also be added to the problem formulation so that a structurally more complex nonlinear optimization problem would have to be solved to determine the weights.)

One approach for adding linear constraints relates to the desirability of "pushing" forces or "pulling" forces at the constraint boundaries. For example, under nominal conditions (dry) feathers do not stick to one another or to the skin, and so the only acting forces should be "pushing" forces. This leads to the constraint conditions at each node i:

$w_i \geq 0$ if $d(r_i) = \Theta_{i_{max}}$, $w_i \leq 0$ if $d(r_i) = \Theta_{i_{max}}$. (17)

These constraints can be interpreted as requiring a "pushing" force from the boundary where the sign of the constraint depends on whether the boundary represents and upper or lower bound. If solutions $w_i$ exist to the combined optimization problem given by Eqs. 15-17, those solutions can be obtained in number of ways. For example, if there are n nodes (e.g., i=1, 2, 3, . . . , n), there are $2^n$ possible sign constraints corresponding to Eq. 17 (i.e., $w_i \leq 0$ or $w_i \leq 0$ for i=1, 2, 3, . . . , n). These $2^n$ possible sign constraints can be combined with Eqs. 15-16 to determine $2^n$ distinct linear programming problems, whose solutions can be checked against the conditions of Eq. 17.

Figure 35:
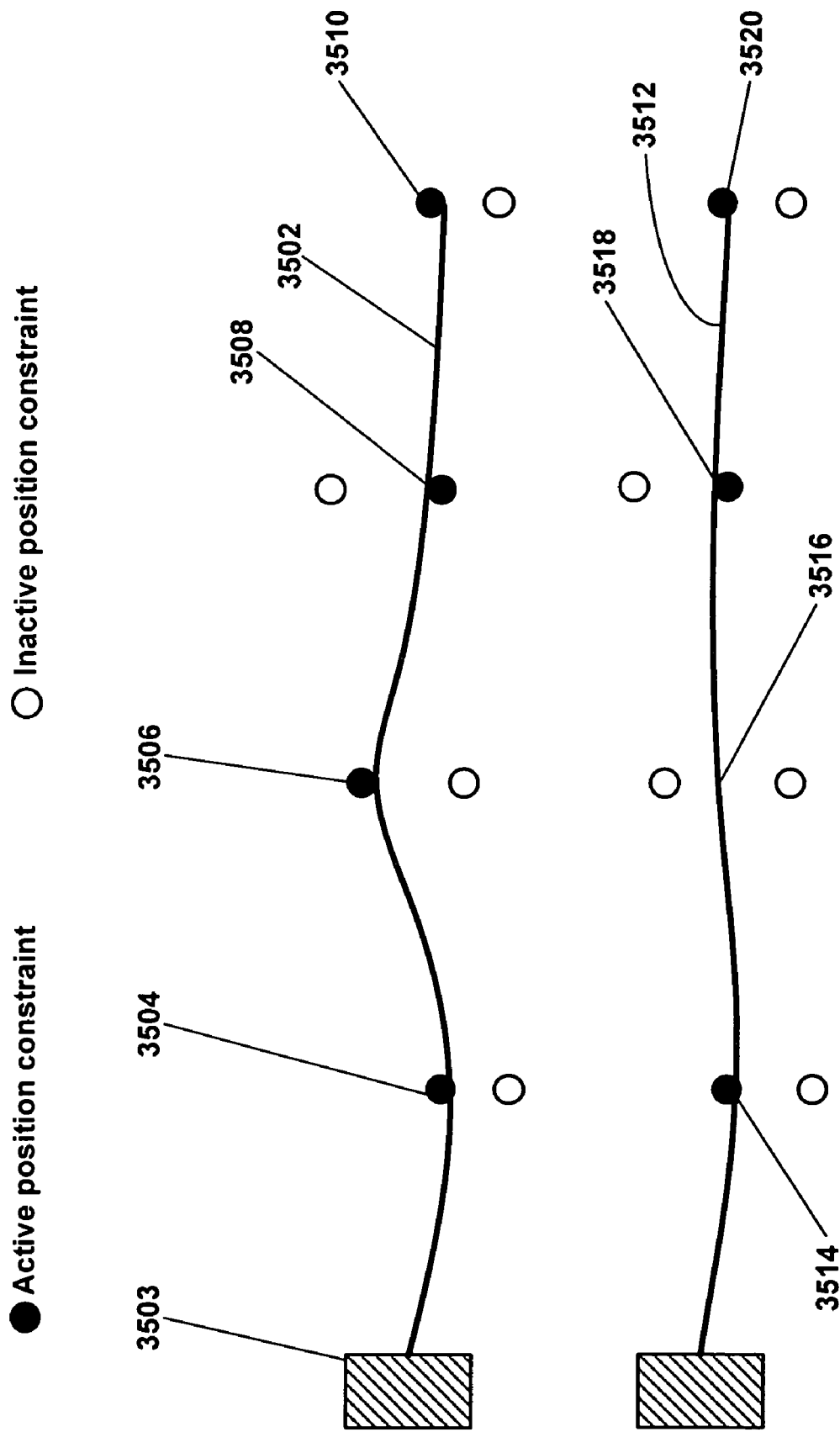
FIG. 35 shows exemplary deformations of shaft elements.

An alternative approach to incorporating the constraints given by Eq. 17 is based on determining feasible solutions of the linear programming problem given by Eqs. 15-16 and then correcting for violations of Eq. 17. That is, feasible solutions can be obtained by selecting boundary conditions from Eq. 16 and imposing equality constraints to determine the coefficients $w_i$ (e.g., as in the Simplex method). For example, FIG. 35 shows a candidate solution 3502 of the form given by Eq. 15 for a cantilevered attachment 3503 where, for each node, an active position constraint at the boundary is denoted by a filled circle and an inactive position constraint at the boundary is denoted by an open circle. Then violations of Eq. 17 can be determined by checking the sign of the coefficients $w_i$. to determine if the force at that node is a "pushing" force or a "pulling" force. For example, for the candidate solution 3502 shown in FIG. 35, the corresponding force at the second node 3506 is a "pulling" force and the forces at the other nodes 3504, 3508, 3510 are "pushing" forces. Therefore, a modified solution 3512 can be derived by eliminating the constraint (and the corresponding basis function) at the second node 3516 while maintaining the "pushing" constraints (and the corresponding basis functions) at the other nodes 3514, 3518, 3520.

In this way, the present invention uses deforming beam models to derive corresponding deformation models that are visually realistic. Notably, a cantilevered beam was previously used in a computer graphics application for animating hair by solving for a deformation from a known set of forces. ("A Simple Method for Extracting the Natural Beauty of Hair", K. Anjyo, Y. Usami, and T. Kurihara, in *Proceedings of SIGGRAPH* 92 (1992), pp. 111-120.)

Figure 18:
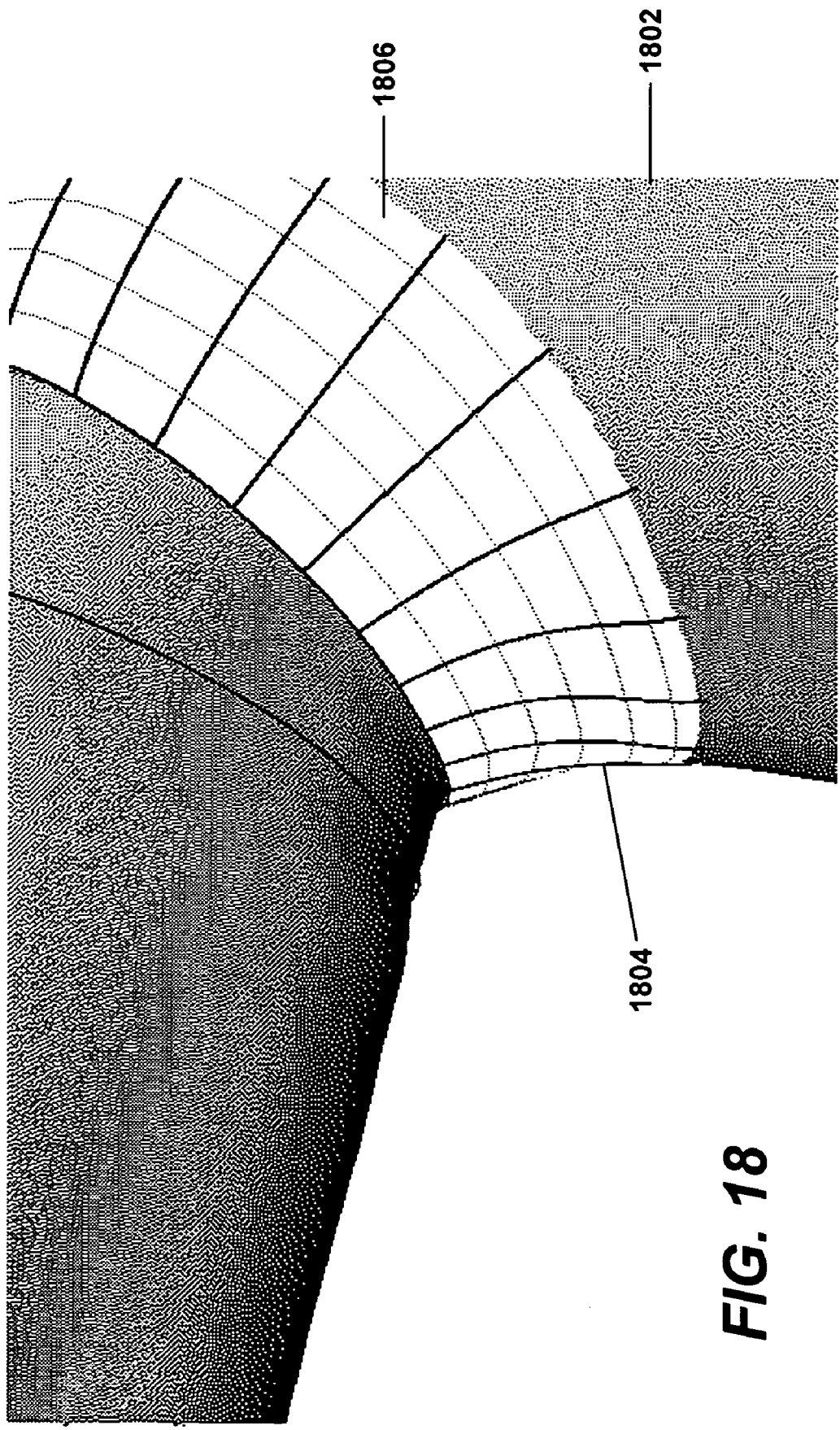
FIG. 18 shows the skin surface of FIG. 17 where the first skirt element has been formed by an interpolation of the deformed shafts.

Continuing with the example of the bird's neck in FIG. 17, FIG. 18 shows the skin surface 1802, where the first skirt element 1804 has been formed by an interpolation of the shafts (e.g., by Non-Uniform Rational B-Splines (NURBS)). Typically, the interpolation between the shafts is not constrained to avoid penetration of the skin surface as illustrated by the scalloped lower edges 1806 of the first skirt element 1804.

Figure 19:
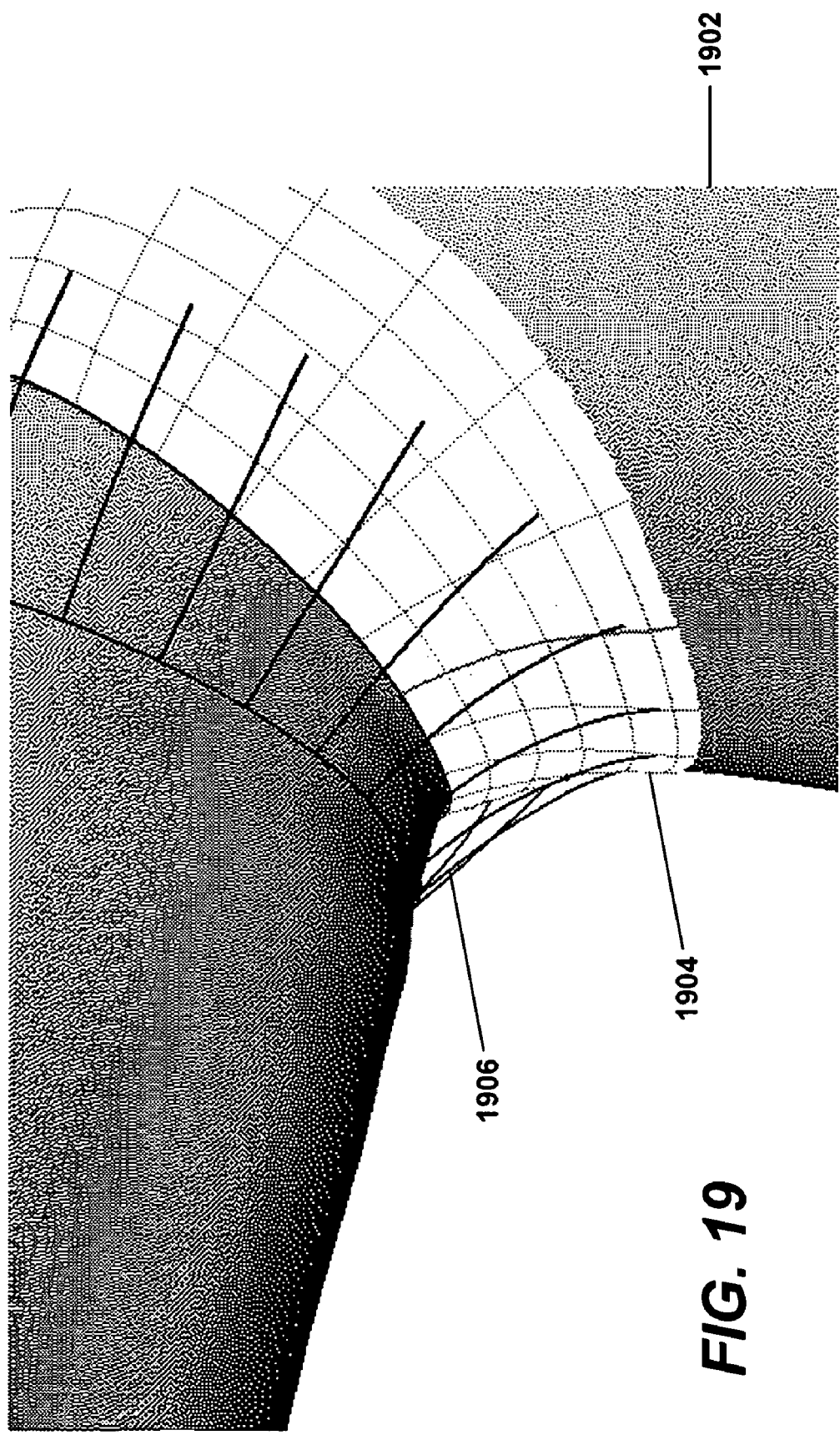
FIG. 19 shows the skin surface of FIG. 18 with the first skirt element in place and with shafts corresponding to the second skirt element deformed to avoid collisions.
Figure 20:
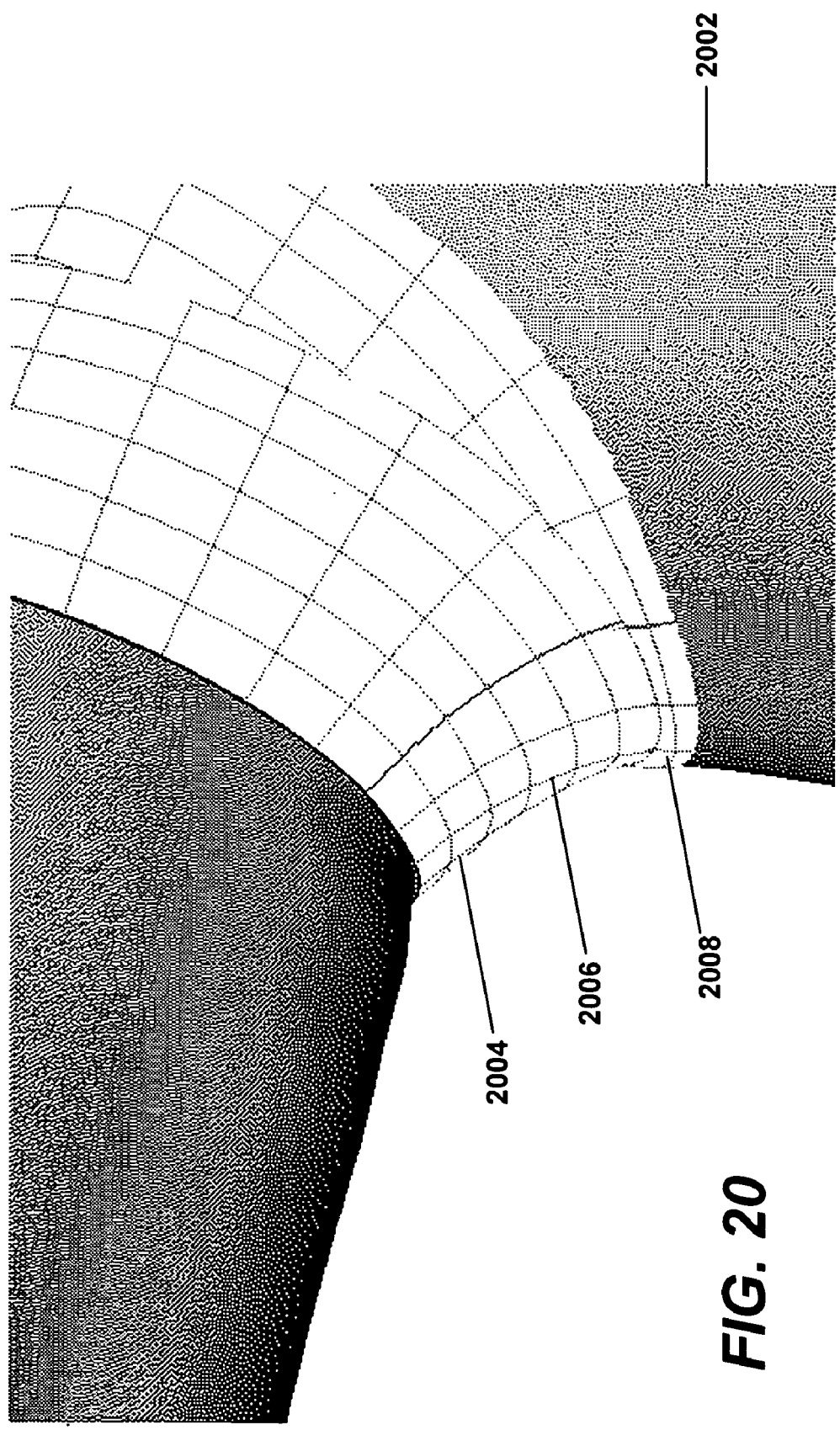
FIG. 20 shows the skin surface of FIG. 19 where the second skirt element has been formed by an interpolation of the deformed shafts.

This process can be continued in accordance with the skirt-ordering sequence where skirt elements 114 are placed to avoid collisions with the skin surface 112 and with previously placed skirt elements 116. FIG. 19 shows the skin surface 1902 with the first skirt element 1904 in place and with shafts 1906 corresponding to the second skirt element deformed to avoid intersections with the skin surface 1902 and the first skirt element 1904. FIG. 20 shows the skin surface 2002 where the second skirt element 2004 has been constructed by interpolating the shafts 2006 (e.g. after deformation as in FIG. 19) to avoid intersections with the skin surface 2002 and the first skirt element 2008.

After the skirt elements 114 have been placed, positions for feather-proxy elements 116 are determined according to the feather-ordering sequence. As discussed below, the feather-proxy elements 116 provide spatial extensions for the feather elements 302 at the animated time 106. By placing the feather-proxy elements 116 in a way that avoids intersections with one another, it becomes possible to extract feather elements 118 without intersections (i.e., interpenetrations). Note that the skirt elements 114 are not shown in the subsequent figures although, as discussed below, they are used in the construction of the feather proxy elements 116.

Figure 21:
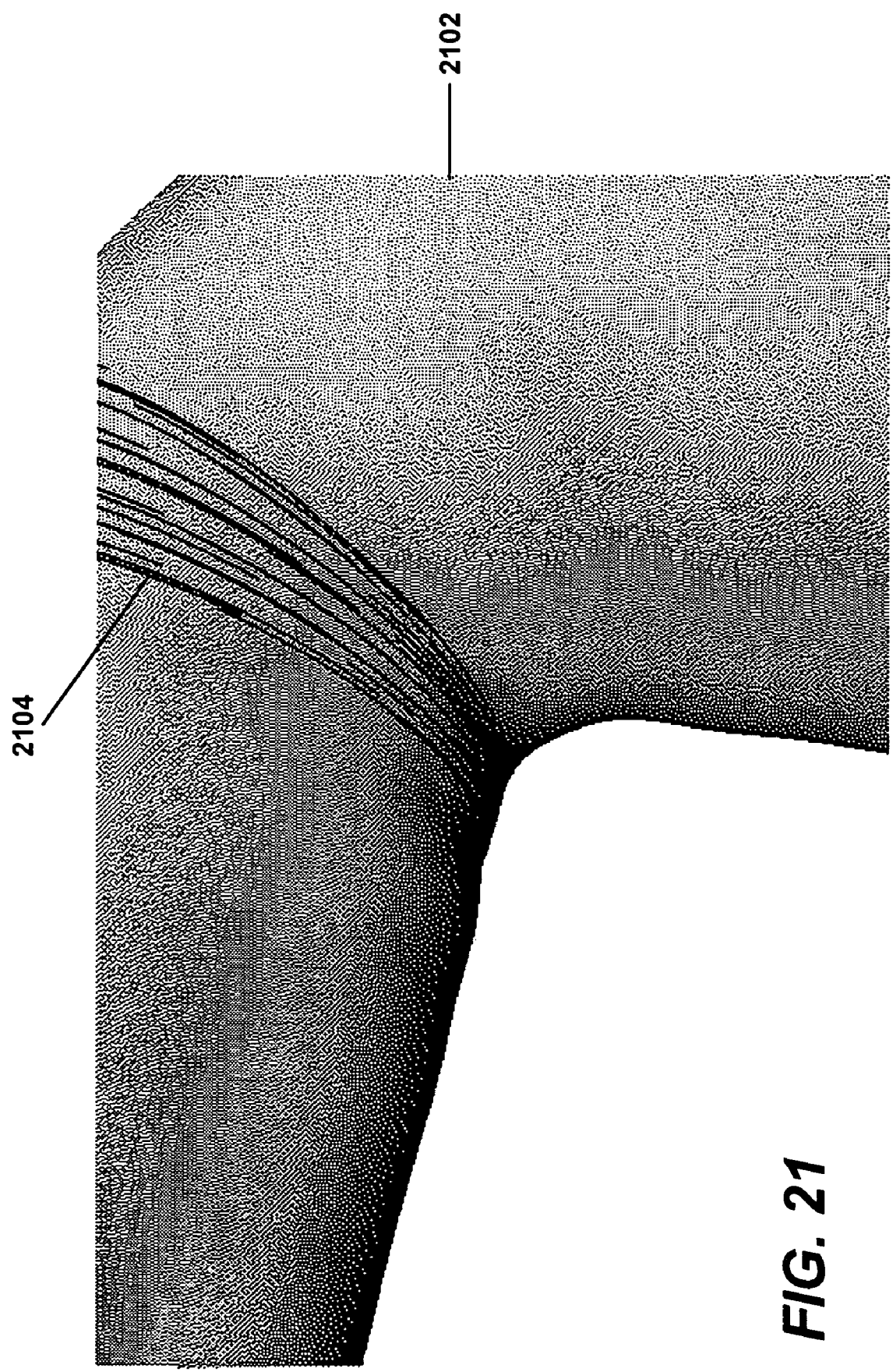
FIG. 21 shows the skin surface of FIG. 11 with feather-proxy-placement curves.

FIG. 21 shows the skin surface 2102 and the feather-proxy-placement curves 2104 at the animated time 106 where these curves 2104 have been animated from the initial curves 904 in the initial setup of the skin surface 902.

Figure 22:
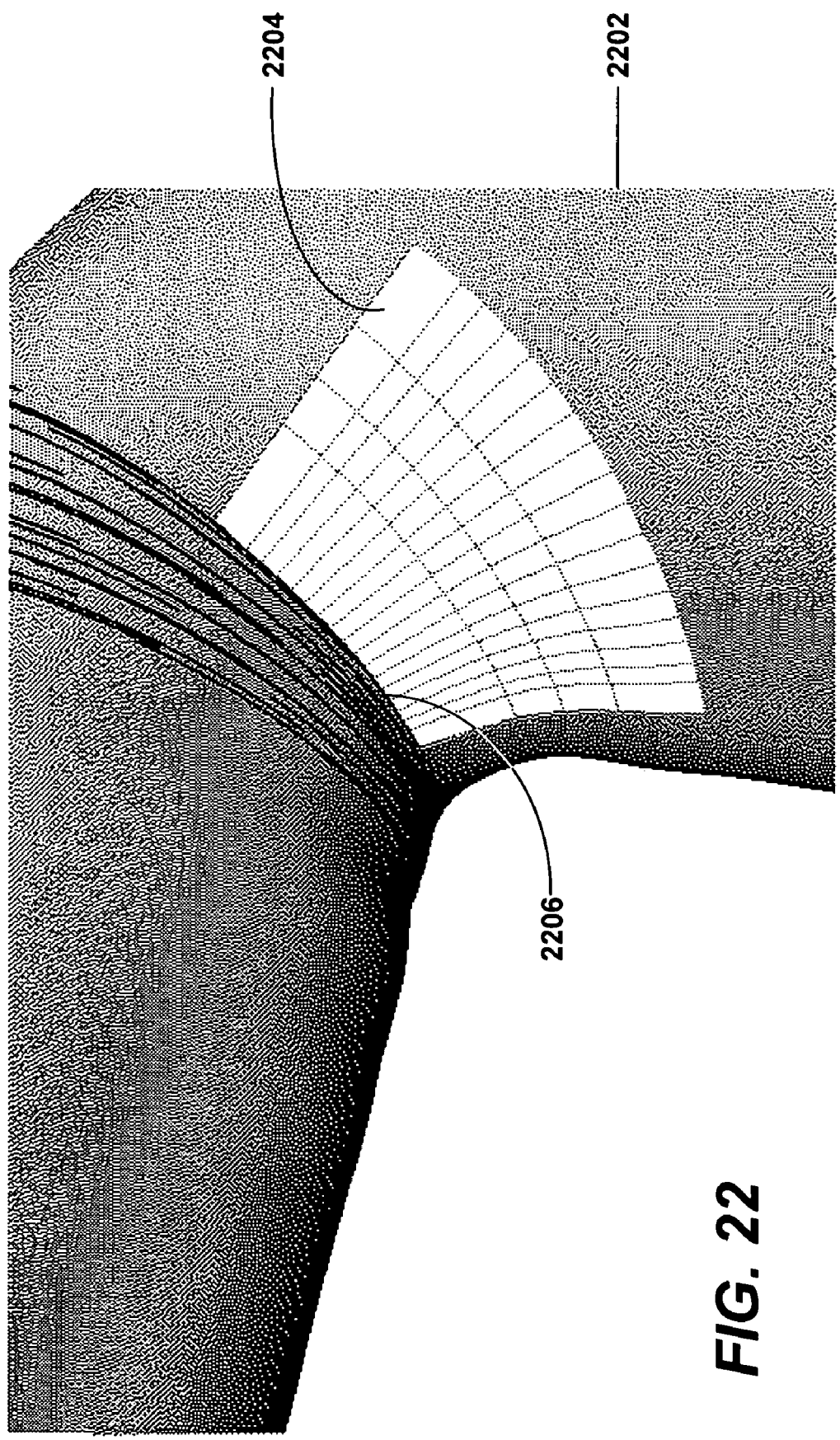
FIG. 22 shows the skin surface of FIG. 21 with the first feather-proxy element.

FIG. 22 shows the skin surface 2202 with the first feather-proxy element 2204, which was formed by extending the first feather-proxy-placement curve 2206 outwardly from the skin surface 2202 through an interpolation (or combination) of nearby skirt elements at the animated time 106. Typically, each feather element is associated with two of the skirt elements (e.g., an upper skirt and a lower skirt). Interpolations can be carried out by standard methods (e.g., with NURBS). In FIG. 22, the first feather-proxy element 2204 has been adjusted by raising it slightly (e.g., 1% of a nominal feather width) at control points to avoid intersections with the surface (e.g., at the control points). For example, a number of control vertices (e.g., 50-150) could be used in an NURBS representation for this purpose. Typically the feather-proxy elements 2204 are designed to spatially overbound the corresponding feather elements (e.g., by 10-50%), and so some intersections with the skin surface 2202 at the edges of the feather proxy element 2204 may be permitted. Note that the techniques discussed above for adjusting skirt elements (and related skirt shafts) can be applied in this context.

Figure 23:
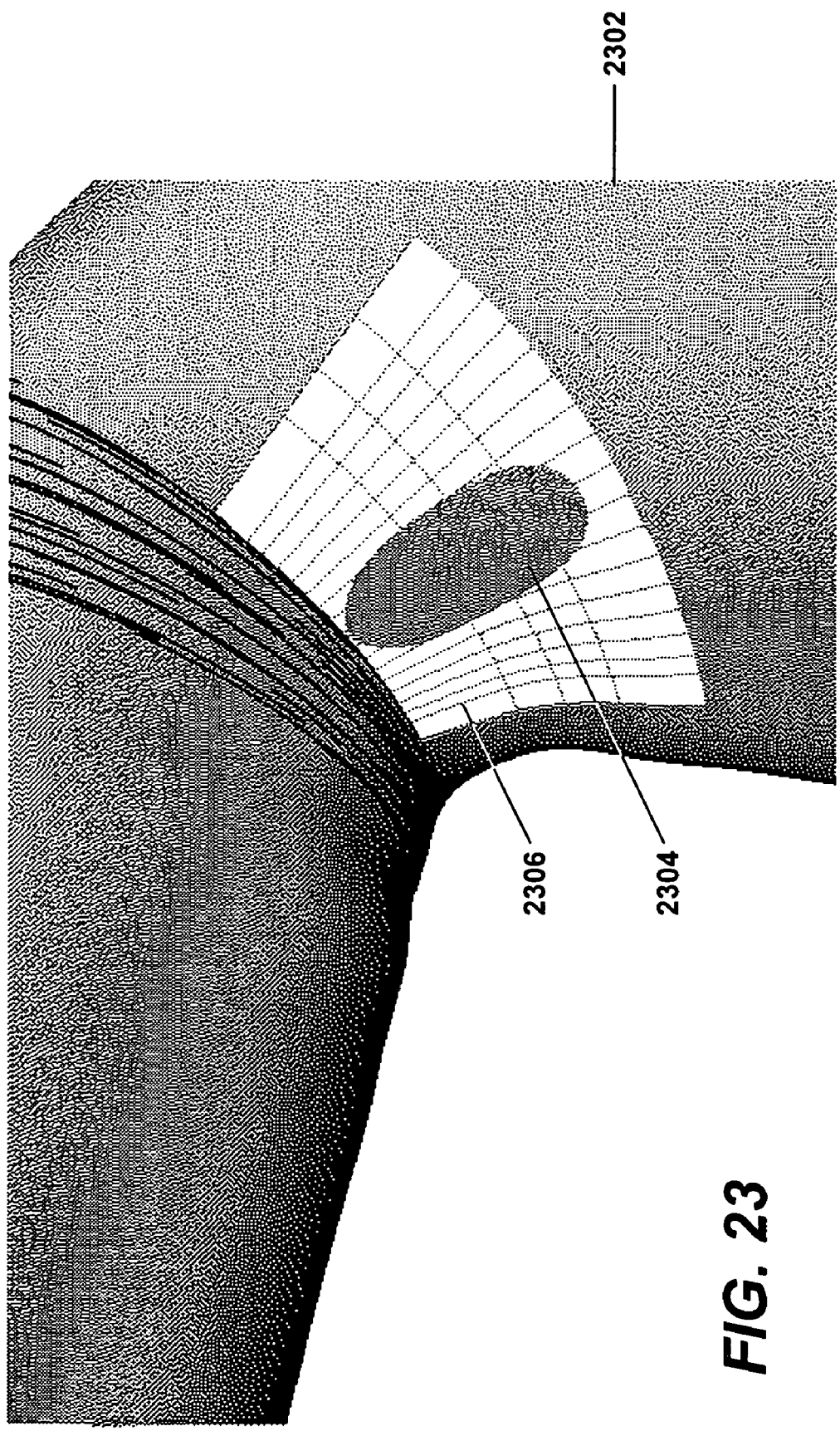
FIG. 23 shows the skin surface of FIG. 22 where the first feather element has been extracted from the first feather-proxy element.
Figure 24:
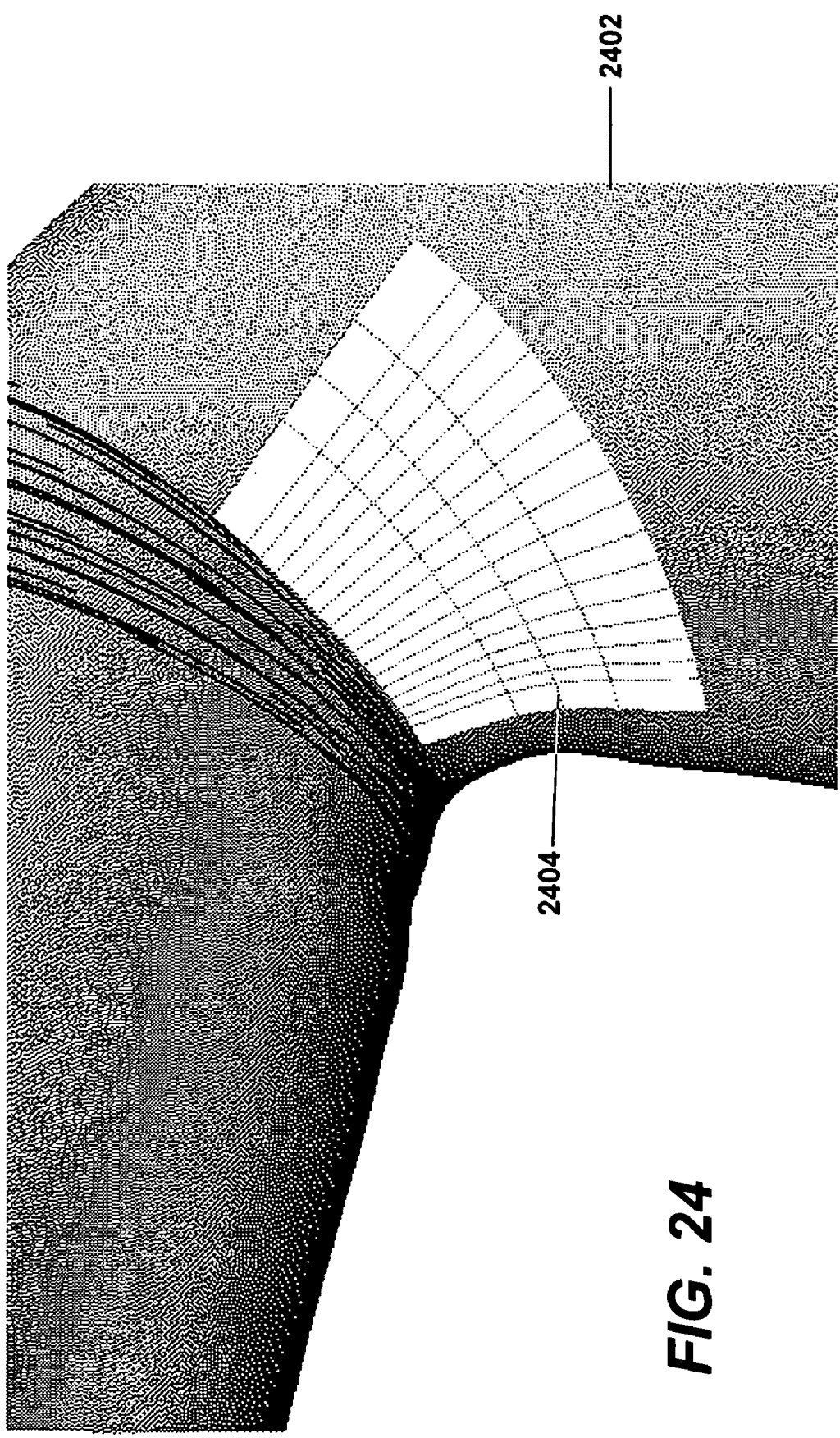
FIG. 24 shows the skin surface of FIG. 23 where the first feather-proxy element has been raised slightly in the normal direction to protect the feather from subsequent intersections.

Next FIG. 23 shows the skin surface 2302 where the first feather element 2304 has been extracted from the first feather-proxy element 2301 by projecting the first feather-element geometry onto the first feather-proxy element (e.g., from the feather-element geometry in FIG. 3). FIG. 23 illustrates a spatial overbounding of the feather element 2304 by the feather-proxy element 2306. After extracting the feather element 2304 from the feather-proxy element 2306, the feather-proxy element may be adjusted to provide some additional buffer space to separate the extracted feather element 2304 from subsequent feather elements. FIG. 24 shows the skin surface 2402 where the first feather-proxy element 2404 has been raised slightly in the normal direction (e.g., 1% of a nominal feather width) so that the feather element 2304 is not visible in FIG. 24. It is possible, for example, to make this adjustment primarily near the center of the feather proxy element 2404 in the portion that corresponds to the feather element 2304.

Figure 25:
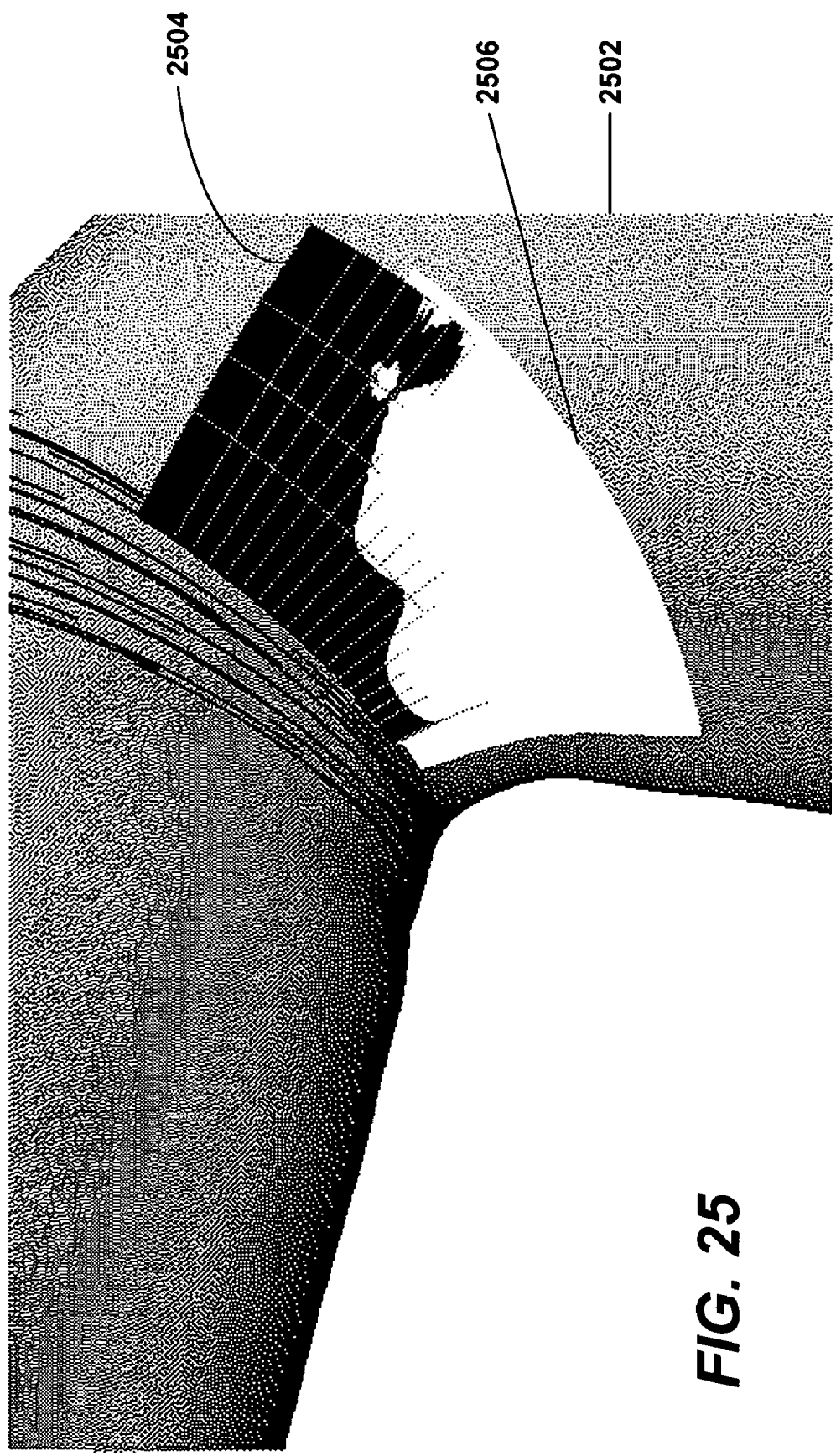
FIG. 25 shows the skin surface of FIG. 24 where the second feather-proxy element, which has been determined by interpolating nearby skirt elements, intersects the first feather-proxy element.

The process then continues by placing subsequent feather-proxy elements and extracting corresponding feather elements. FIG. 25 shows the skin surface 2502 where the second feather-proxy element 2504 has been determined by interpolating nearby skirt elements (e.g., as in FIG. 22). The second feather-proxy element 2504 intersects with the first feather-proxy element 2506, which may have been raised slightly after extraction of the first feather element 2304.

Figure 26:
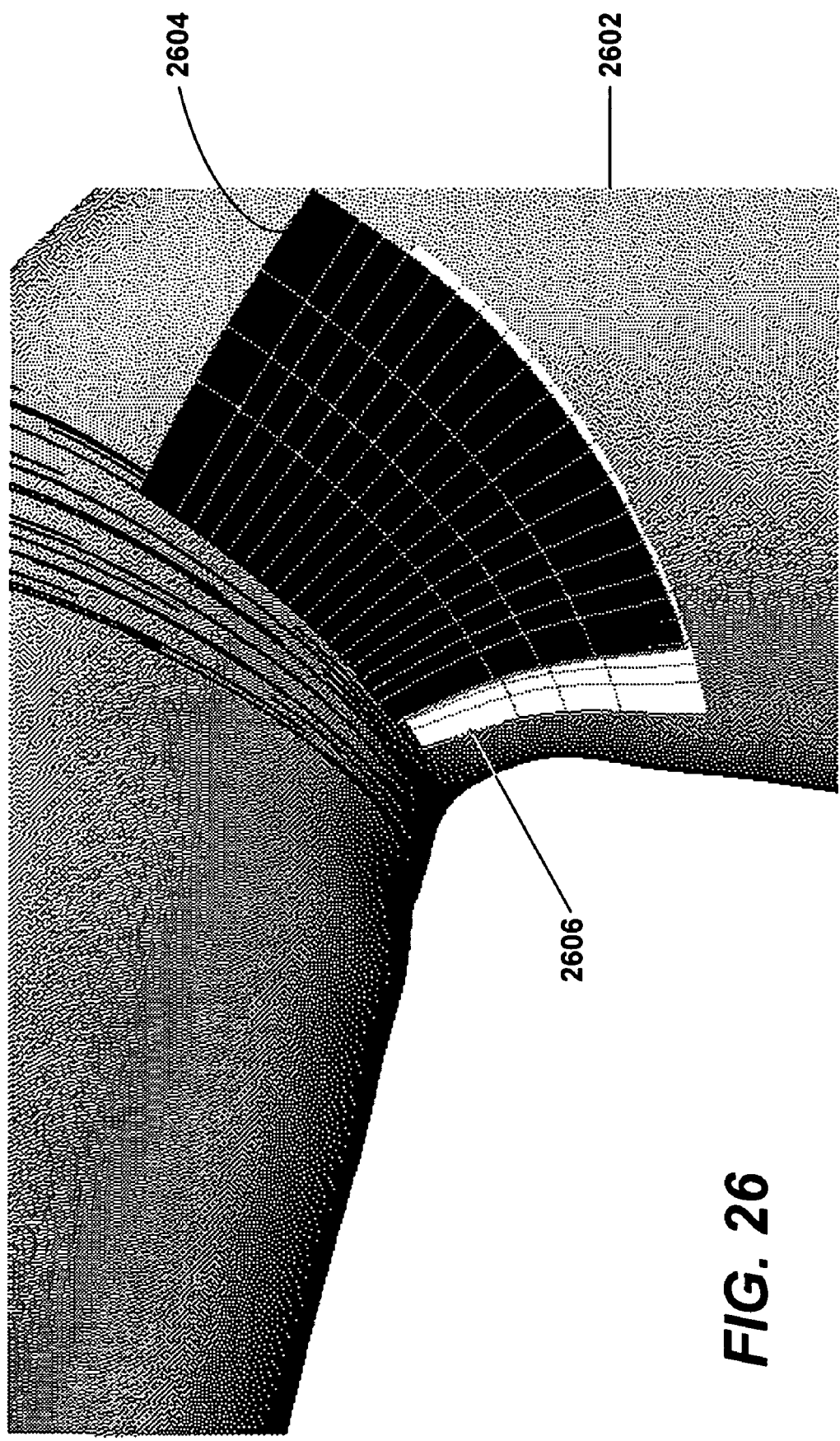
FIG. 26 shows the skin surface of FIG. 25 where the second feather-proxy element has been adjusted (e.g., raised slightly) at control points to avoid intersections with the surface and with the previously placed first feather-proxy element.

FIG. 26 shows the skin surface 2602 where the second feather-proxy element 2604 has been adjusted (e.g., raised slightly) at control points to avoid intersections with the surface and with the previously placed first feather-proxy element 2606 (e.g., at the control points). For example, as discussed above with respect to FIG. 22, a number of control vertices could be used in an NURBS representation for this purpose. The second feather element can then be extracted from the second feather-proxy element 2604 (e.g., as in FIG. 23).

Figure 27:
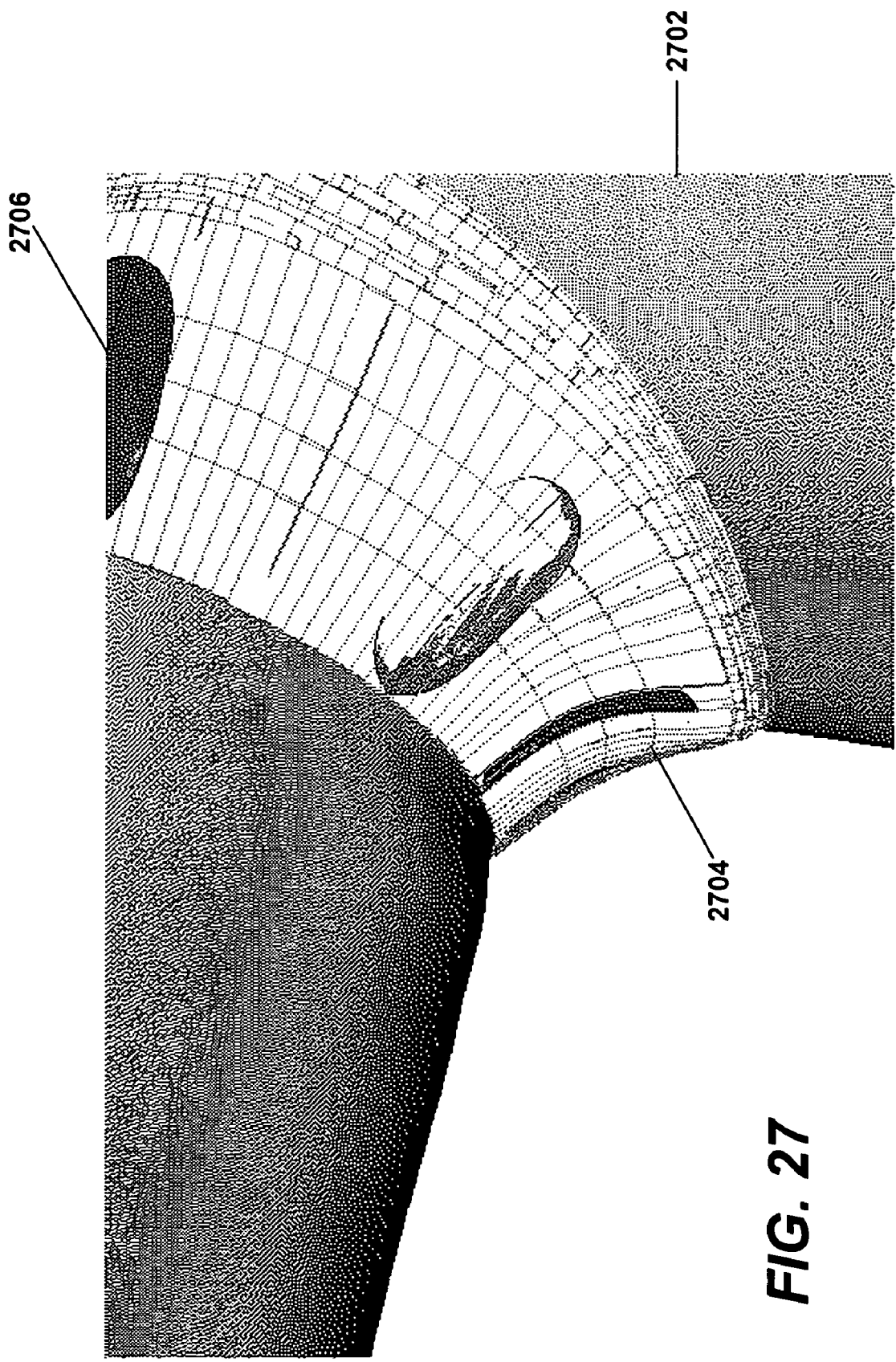
FIG. 27 shows the skin surface of FIG. 26 with multiple feather-proxy elements and corresponding feather elements.
Figure 28:
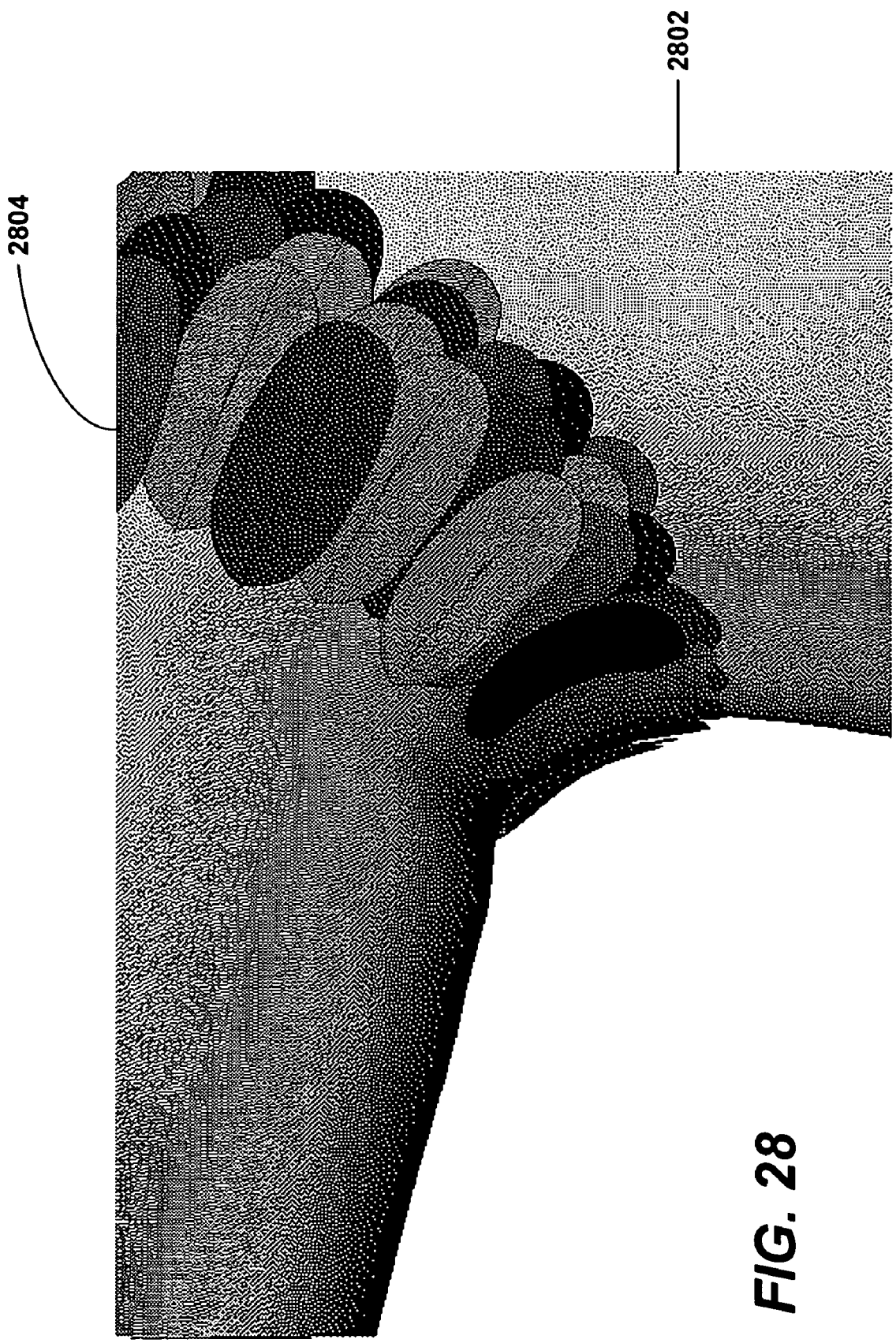
FIG. 28 shows the skin surface of FIG. 27 with multiple feather elements in place.

The process then continues according to the feather-ordering sequence till all the feather-proxy elements have been placed and on the skin surface and the corresponding feather elements have been extracted from the feather-proxy elements. In this way, the feather-proxy elements 116 satisfy a separation criterion for avoiding intersections between the feather-proxy elements, and this enables a consistent relative placement of the feather elements. FIG. 27 shows the skin surface 2702 with multiple feather-proxy elements 2704 and corresponding feather elements 2706. For the rendering of the image, of course, the feather proxy elements 2704 are discarded from the image. FIG. 28 shows multiple feather elements 2804 placed on the skin surface 2802.

Figure 36:
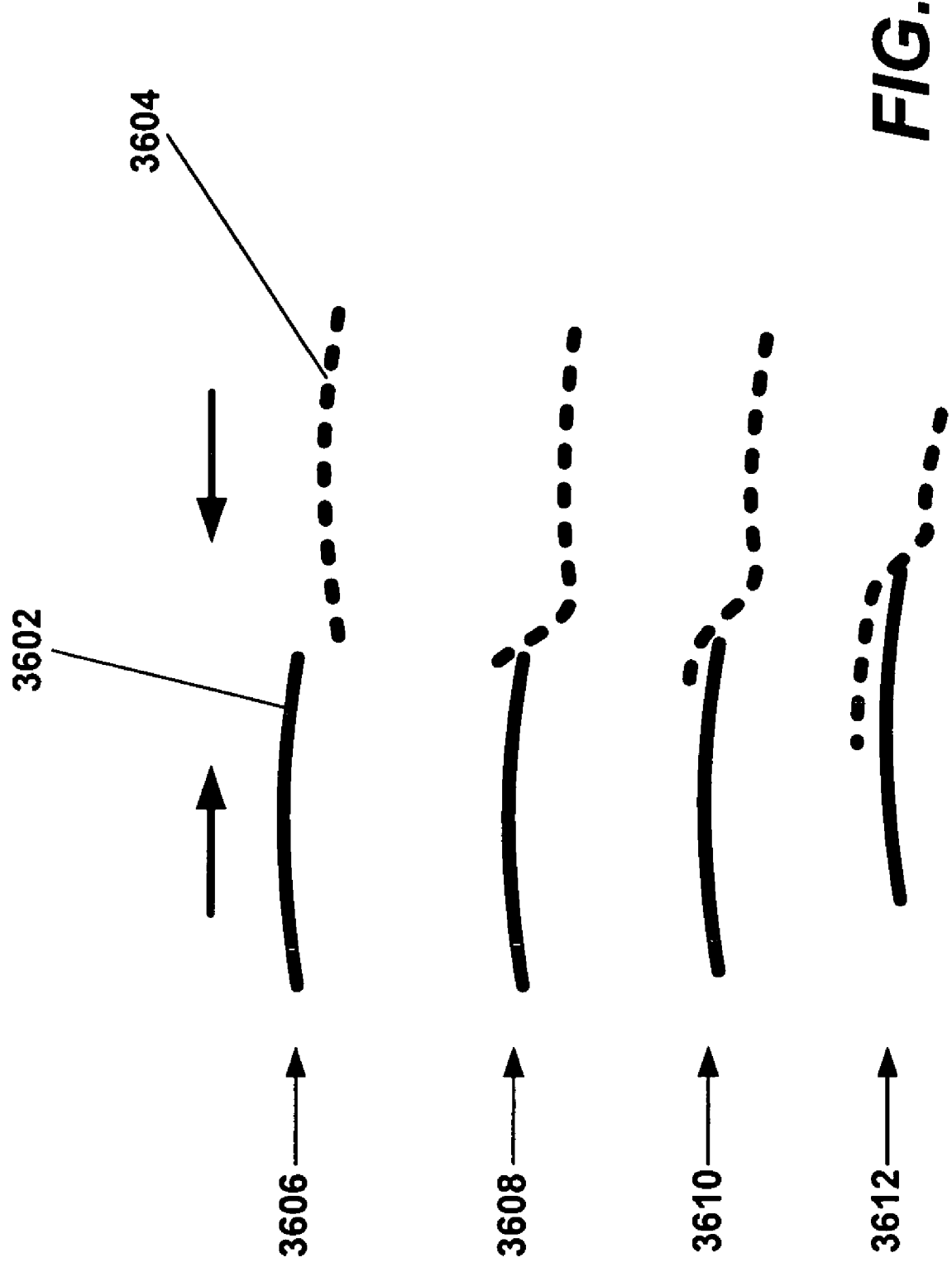
FIG. 36 shows an exemplary collision and response for two feather elements.
Figure 37:
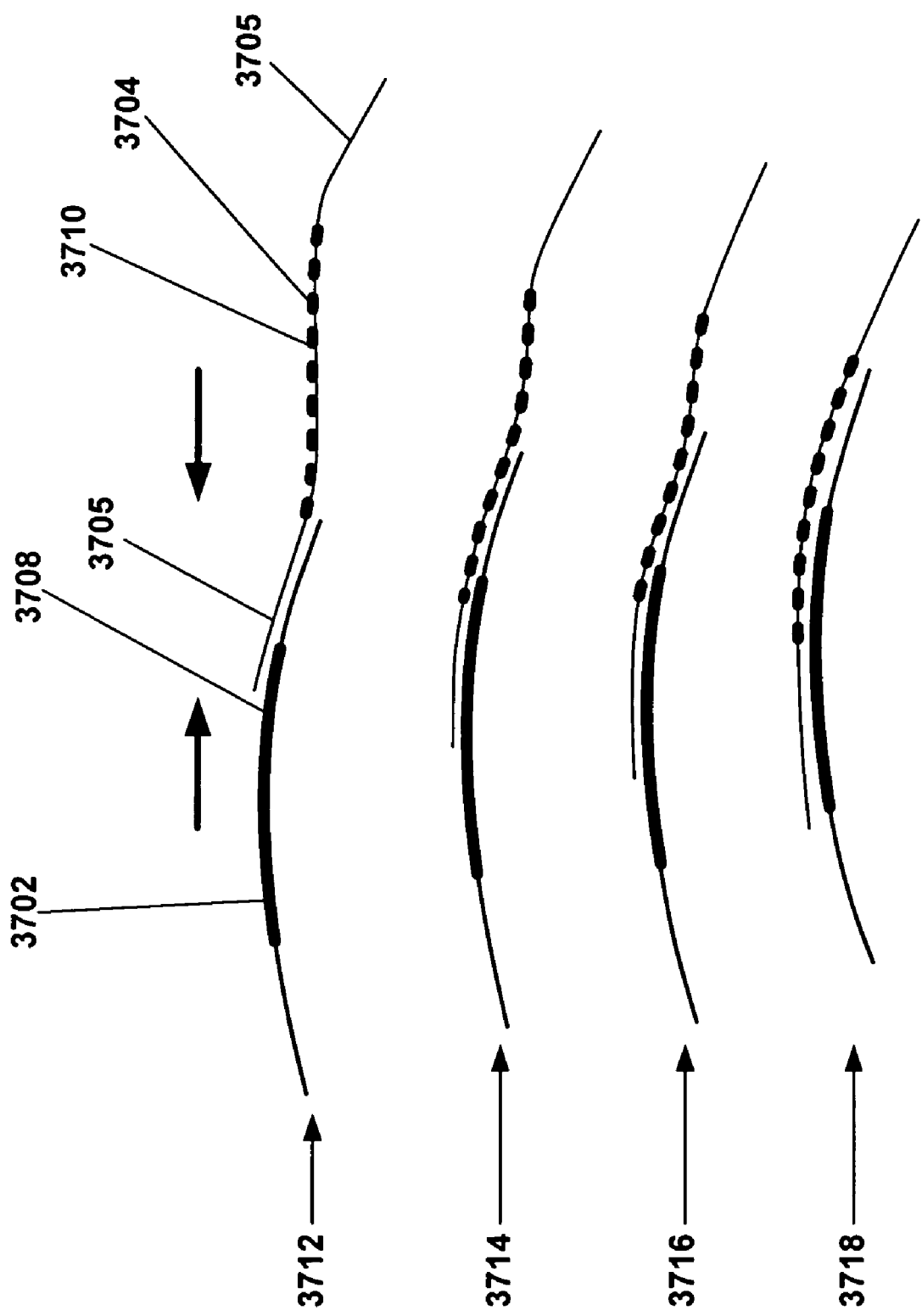
FIG. 37 shows an exemplary collision and response for two feather elements with spatial extensions.

FIGS. 36 and 37 show sliced end views that illustrate the advantages of the feather-proxy elements 2704. FIG. 36 is an sliced end view (looking parallel to the feather shaft's axis) of two feathers (or feather elements) 3602, 3604 over four frames of animation that illustrate a common and problematic scenario as the two feathers move towards one another (e.g., as indicated by the opposing arrows). At a first time 3606 the two feathers 3602, 3604 are close together but not interfering with each other. But as the they move toward each other and begin to overlap (at a second time 3608), the right feather 3604 must rise up abruptly to lay on top of the left feather 3602. As the animation proceeds from the second time 3608 to a third time 3610 and a fourth time 3612, the overall result is unacceptable both spatially and temporally.

Spatially, the right feather 3604 now has a sharp crease where the edge has risen up onto the left feather 3602. This could be removed through some form of smoothing or physically based deformation model. Even then, the temporal problem would still be present since over the duration of just one frame, the feather 3604 has "popped" upward in order to satisfy the predetermined layering requirement that it be above it's neighbor 3602. The result is an unphysical, unpleasant, visually distracting motion on film.

By contrast, FIG. 37 illustrates advantages associated with using feather-proxy elements that provide a spatial overbounding of the feathers. FIG. 37 is a similar sliced end view of two corresponding feather proxy elements 3702, 3704 that include lateral spatial extensions 3706 as well as underlying feather elements feathers 3608, 3610 (shown as heavier lines). As noted above, once the placement process is completed and the underlying feathers 3608, 3610 are extracted from the feather proxies 3702, 3704, the proxies are deleted so that that they are not visible in the final result seen on film. At the first time 3712 when the two underlying feathers 3708, 3710 are still a significant distance apart (roughly one feather width apart) the right proxy 3704 will begin to detect and react to the other proxy 3702. Preferably, the deformations of the proxy edges 3705 do not significantly affect the underlying feathers 3708, 3710. As shown by the subsequent times 3714, 3716, 3718, as the proxies 3702, 3704 collide with one another, the underlying feathers 3708, 3710 smoothly rises up and over without the "popping" artifact.

Figure 38:
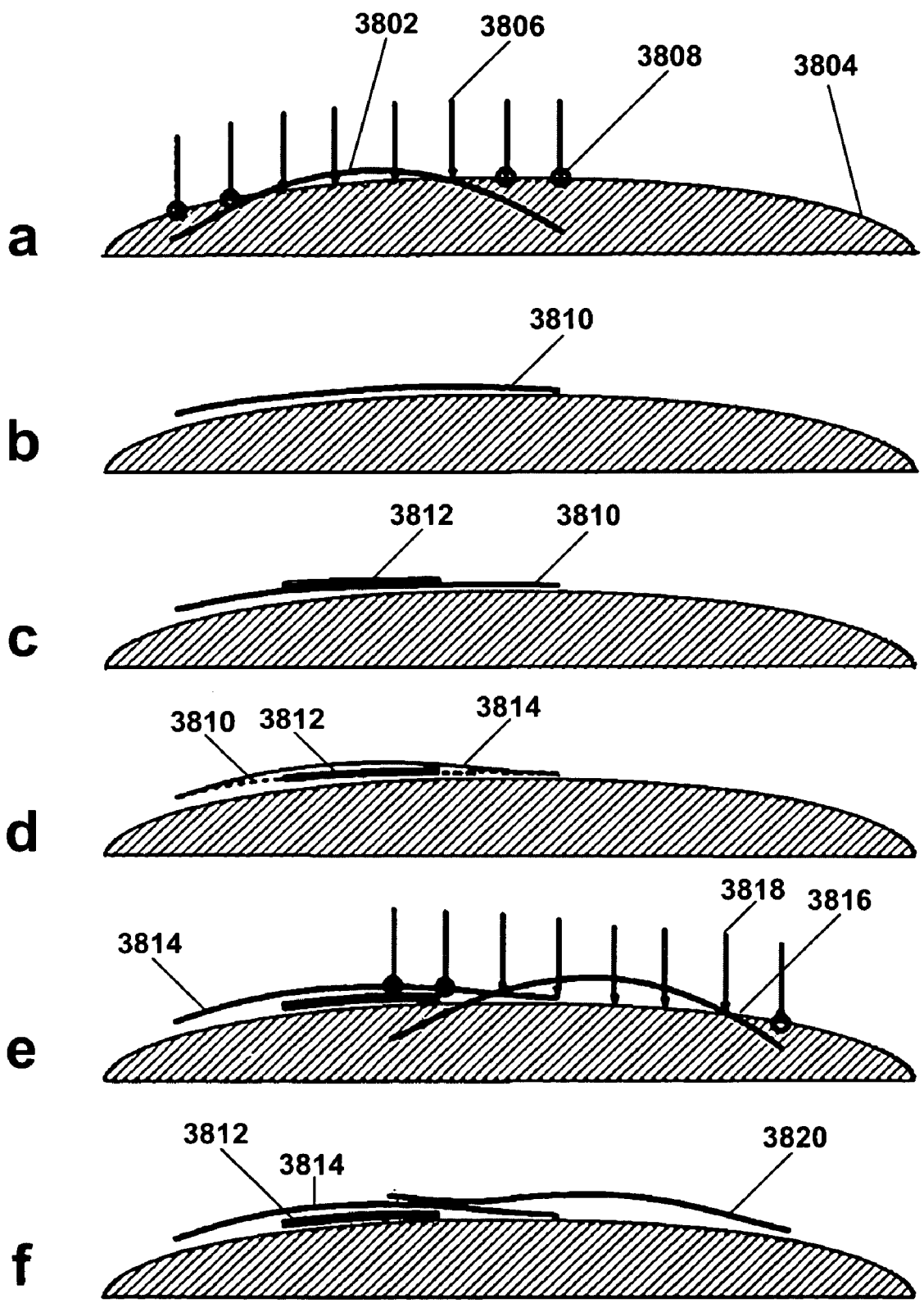
FIG. 38 shows an exemplary layering of feather proxy elements.

FIG. 38 shows a simplified end view of the proxy layering process, where the illustrated steps a-f are related to previous figures.

Steps a-b correspond to FIG. 22, which shows the first feather proxy element 2204. In step a, an initial feather proxy element 3802 is shown penetrating a surface (including skirt elements and the skin surface) 3804. The arrows 3806 represent rays cast to detect intersections with nearby objects, for example, as each ray passes through a control point (or control vertex) of the feather proxy element 3802. The rays 3806 are cast in a direction normal to the proxy surface 3802, though it does not appear so in this simplified diagram since the curvature of the proxy 3802 is greatly exaggerated for illustrative purposes. In any event where a ray intersects other geometry before intersecting its proxy, we know that the proxy is colliding as indicated by the circles 3808. In step b each control point for the proxy 3810 has been raised (as discussed above with respect to FIG. 22) to avoid intersections with the surface 3804 (preferably including a small buffer, e.g., 1% of a nominal feather width).

Step c corresponds to FIG. 23, which shows the extraction of the first feather element 2304 from the first feather proxy element 2306. Step c shows the feather element 3812 that has been extracted from the feather proxy element 3810.

Step d corresponds to FIG. 24, which shows the first feather-proxy element 2404 raised slightly in the normal direction Step d shows the proxy 3814 being "inflated" from its current position 3810 to cover the feather 3812 by a small buffer (e.g., 1% of a nominal feather width) that smoothly falls off to the edges of the proxy 3814.

Step e corresponds to FIG. 25, which shows the second feather-proxy element 2504 intersecting with the first feather-proxy element 2506. Step c shows the restarting of the proxy-placement process with the next proxy 3816, where the order corresponds to feather-ordering sequence 700. In this case the rays 3818 cast for the next proxy 3816 collide with both the skin surface 3804 and the previously derived proxy 3814.

Step f corresponds to FIG. 26, where the second feather-proxy element 2604 has been adjusted (e.g., raised slightly) at control points to avoid intersections with the surface and with the previously placed first feather-proxy element 2606. Step f shows the new proxy 3820 after it has been deformed so that it does not collide with the first proxy 3814 that now protects the first feather element 3812. As in the previous example, the adjustment may include a suitable buffer (e.g., 1% of a nominal feather width).

Steps a-f in FIG. 38 can be continued for deriving additional proxies and feather elements. As this process is continued, tests for collisions may be restricted to the most recently constructed proxies that are spatially nearby since proxies are constructed to lie above previously constructed nearby proxies as well as the skin surface.

Additionally, the above-described process can be carried out independently for multiple animated times. In this way the present invention enables an independent development of animated scenes while maintaining a consistent ordering of the feather elements on the skin surface. That is, the positions of the feather elements at a first animated time and a second animated time provide consistent relative placement of the feather elements to avoid undesirable intersections and related effects (e.g., popping). (Note that the words "first" and "second" are used here and elsewhere for labeling purposes only and are not intended to denote any spatial or temporal ordering. Furthermore, the labeling of a "first" element does not imply the presence a "second" element.)

Additional embodiments relate to an apparatus that includes a computer that executes computer instructions for carrying out any one of the above-described methods. In this context the computer may be a general-purpose computer including, for example, a processor, memory, storage, and input/output devices (e.g., monitor, keyboard, disk drive, Internet connection, etc.). However, the computer may include a specialized microprocessor or other hardware for carrying out some or all aspects of the methods. Additional embodiments also relate to a computer-readable medium that stores (e.g., tangibly embodies) a computer program for carrying out any one of the above-described methods by means of a computer. The computer program may be written, for example, in a general-purpose programming language (e.g., C, C++) or some specialized application-specific language.

Although only certain exemplary embodiments of this invention have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A computer-implemented method of animating feather elements, comprising:
    specifying initial positions for a skin surface;
    specifying an initial placement for each of a plurality of feather elements, each feather element including a shaft having a root at a proximal end for attaching the feather element to the skin surface at a root-attachment point and a tip at a distal end away from the skin surface, and the feather element further including vane structures extending laterally from the shaft;
    specifying a subsequent position for the skin surface at an animated time;
    determining, using a processor, a feather-ordering sequence for placing the feather elements on the skin surface;
    determining, using the processor, a placement for each of a plurality of feather-proxy elements according to the feather ordering sequence and the initial placement of the plurality of feather elements;
    deforming the plurality of feather-proxy elements, which provide spatial extensions for the feather elements at the animated time, wherein the feather-proxy elements are deformed so as to not interfere with the subsequent positions of the skin surface,
    and wherein the feather-proxy elements satisfy a separation criterion for avoiding intersections between the feather-proxy elements; and
    determining, using the processor, a subsequent placement for each of the feather elements at the animated time by extracting the feather elements from the feather-proxy elements.

2. A method according to claim 1, further comprising:
    determining a feather-ordering scalar function defined on at least a portion of the skin surface so that values of the feather-ordering scalar function at the root-attachment points of the feather elements determine the feather-ordering sequence.

3. A method according to claim 2, further comprising:
    determining skirt-placement curves on the skin surface by evaluating the feather-ordering scalar function at selected locations on the skin surface;
    determining a skirt-ordering sequence for placing skirt elements on the skin surface from values of the feather-ordering scalar function on the skirt-placement curves; and
    determining the feather-proxy elements from the skirt elements.

4. A method according to claim 3, wherein determining the positions of the skirt elements at the animated time includes:
    specifying positions for feather-element projections at the animated time;
    forming the skirt elements by extending the skirt-placement curves outwardly from the skin surface through an interpolation of shaft elements associated with the feather-elements projections; and
    adjusting one or more control points of the skirt elements to avoid intersections with the skin surface and with skirt elements that are earlier in the skirt-ordering sequence.

5. A method according to claim 2, further comprising:
    determining feather-proxy-placement curves on the skin surface by evaluating the feather-ordering scalar function to determine feather-proxy-placement curves that include the root-attachment points of the feather elements, wherein determining the placement for each of the feather-proxy elements at the animated time includes:
    forming the feather-proxy elements by extending portions of the feather-proxy-placement curves outwardly from the skin surface through an interpolation of nearby skirt elements at the animated time; and
    adjusting one or more control points of the feather-proxy elements to avoid intersections with the skin surface and with feather-proxy elements that are earlier in the feather-ordering sequence.

6. A method according to claim 2, wherein determining the feather-ordering scalar function includes:
    determining an initial vector field on at least a portion of the skin surface from the initial placement of the feather elements, wherein the initial vector field includes a plurality of vectors and each vector has a magnitude and a direction;
    determining a feather-ordering gradient vector field from the initial vector field to enable a mathematical integration of the feather-ordering gradient vector field; and
    determining the feather-ordering scalar function through a mathematical integration of the feather-ordering gradient vector field.

7. A method according to claim 6, wherein determining the feather-ordering gradient vector field includes adjusting at least some vector magnitudes of the initial vector field to enable an integration of the feather-ordering gradient vector field.

8. A method according to claim 1, further comprising:
    determining skirt-placement curves on the skin surface at selected locations on the skin surface for placing skirt elements;
    determining a skirt-ordering sequence for placing the skirt elements on the skin surface, wherein determining the positions for the skirt elements at the animated time includes placing the skirt elements on the skin surface at the animated time according to the skirt-ordering sequence; and
    determining the feather-proxy element from the skirt elements.

9. A method according to claim 8, wherein placing the skirt elements on the skin surface at the animated time includes:
specifying positions for feather-element projections at the animated time;
forming the skirt elements by extending the skiff-placement curves outwardly from the skin surface through an interpolation of shaft elements associated with the feather-elements projections, and
adjusting one or more control points of the skirt elements at the animated time to avoid intersections with the skin surface and with skirt elements that are earlier in the skirt-ordering sequence.

10. A method according to claim 9, further comprising: determining the positions for feather-element projections at the animated time by animating the feather elements to the animated time from an initial time associated with the initial placement.

11. A method according to claim 9, wherein adjusting the one or more control points of the skirt elements includes calculating a deformation of at least one shaft element from a pushing force.

12. A method according to claim 1, further comprising:
determining feather-proxy-placement curves on the skin surface at selected locations that include the root-attachment points for the feather elements, wherein determining the placement for each of the feather-proxy elements at the animated time includes:
forming the feather-proxy elements at the animated time by extending the feather-proxy-placement curves outwardly from the skin surface through an interpolation of nearby skirt elements at the animated time; and
adjusting one or more control points of the feather-proxy elements to avoid intersections with the skin surface and with feather-proxy elements that are earlier in the feather-ordering sequence.

13. A method according to claim 1, wherein the separation criterion includes adjusting one or more control points of the feather-proxy elements to avoid intersections with feather-proxy elements that are earlier in the feather-ordering sequence.

14. A method according to claim 1, wherein determining the subsequent placement for each of the feather elements at the animated time includes projecting feather geometries onto corresponding feather-proxy elements to extract the feather elements from the feather-proxy elements.

15. A method according to claim 1, further comprising: determining the positions for the skin surface at the animated time by animating the skin surface to the animated time from an initial time associated with the initial positions.

16. A method according to claim 1, wherein the animated time is a first animated time and the method further comprises:
specifying positions for the skin surface at a second animated time;
determining a placement for each of a plurality of second feather-proxy elements according to the feather ordering sequence and the initial placement of the plurality of feather elements;
deforming the plurality of second feather-proxy elements, which provide spatial extensions for the feather elements at the second animated time, wherein the second feather-proxy elements are deformed so as to not interfere with the subsequent positions of the skin surface, and wherein the second feather-proxy elements satisfy a separation criterion for avoiding intersections between the second feather-proxy elements; and
determining a second subsequent placement for each of the feather elements at the second animated time by extracting the feather elements from the second feather-proxy elements, wherein the placement of the feather elements at the first and second animated times provide consistent relative placement of the feather elements.

17. A computer-implemented method of determining a feather-ordering sequence for animating feather elements, comprising:
specifying initial positions for a skin surface;
specifying initial positions for a plurality of feather elements, each feather element including a shaft having a root at a proximal end for attaching the feather element to the skin surface at a root-attachment point and a tip at a distal end away from the skin surface, and the feather element further including vane structures extending laterally from the shaft;
determining, using a processor, an initial vector field on at least a portion of the skin surface from the initial positions for the feather elements, wherein the initial vector field includes a plurality of vectors and each vector has an initial magnitude and a direction;
determining, using the processor, a feather-ordering gradient vector field from the initial vector field to enable a mathematical integration of the feather-ordering gradient vector field; and
determining, using the processor, a feather-ordering scalar function through the mathematical integration of the feather-ordering gradient vector field, wherein values of the feather-ordering scalar function at the root-attachment points of the feather elements determine the feather-ordering sequence for animating the feathers elements.

18. A method according to claim 17, wherein determining the feather-ordering gradient vector field includes adjusting at least some vector magnitudes of the initial vector field to enable a mathematical integration of the feather-ordering gradient vector field.

19. A method according to claim 17, further comprising:
determining a plurality of skirt-placement curves on the skin surface by evaluating the feather-ordering scalar function at selected locations on the skin surface; and
determining a skirt-ordering sequence for placing a plurality of skirt elements on the skin surface from values of the feather-ordering scalar function on the skiff-placement curves, wherein the skirt elements provide spatial extensions for the skin surface.

20. A method according to claim 19, further comprising:
forming the skirt elements by extending the skiff-placement curves outwardly from the skin surface through an interpolation of nearby surface-defining elements; and
adjusting one or more control points of the skirt elements to avoid intersections with the skin surface and with skirt elements that are earlier in the skirt-ordering sequence.

21. A method according to claim 17, further comprising:
determining feather-proxy-placement curves on the skin surface by evaluating the feather-ordering scalar function to determine feather-proxy-placement curves that include the root-attachment points of the feather elements;
forming a plurality of feather-proxy elements according to the feather-ordering sequence by extending portions of the feather-proxy-placement curves outwardly from the skin surface through an interpolation of nearby surface-defining elements;
adjusting one or more control points of the feather-proxy elements to avoid intersections with the skin surface and with feather-proxy elements that are earlier in the feather-ordering sequence; and extracting updated positions for the feather elements from the adjusted feather proxy elements.

22. An apparatus for animating feather elements, the apparatus comprising a computer for executing computer instructions, wherein the computer includes computer instructions for:

specifying initial positions for a skin surface;

specifying an initial placement for each of a plurality of feather elements, each feather element including a shaft having a root at a proximal end for attaching the feather element to the skin surface at a root-attachment point and a tip at a distal end away from the skin surface, and the feather element further including vane structures extending laterally from the shaft;

specifying a subsequent position for the skin surface at an animated time;

determining a feather-ordering sequence for placing the feather elements on the skin surface;

determining a placement for each of a plurality of feather-proxy elements according to the feather ordering sequence and the initial placement of the plurality of feather elements;

deforming the plurality of feather-proxy elements, which provide spatial extensions for the feather elements at the animated time, wherein the feather-proxy elements are deformed so as to not interfere with the subsequent positions of the skin surface, and wherein the feather-proxy elements satisfy a separation criterion for avoiding intersections between the feather-proxy elements; and determining a subsequent placement for each of the feather elements at the animated time by extracting feather elements from the feather-proxy elements.

23. An apparatus according to claim 22, wherein the computer further includes computer instructions for:

determining a feather-ordering scalar function defined on at least a portion of the skin surface so that values of the feather-ordering scalar function at the root-attachment points of the feather elements determine the feather-ordering sequence.

24. An apparatus according to claim 22, wherein the computer further includes computer instructions for:

determining a skirt-placement curves on the skin surface at selected locations on the skin surface for placing skirt elements;

determining a skirt-ordering sequence for placing the skirt elements on the skin surface, wherein determining the positions for the skirt elements at the animated time includes placing the skirt elements on the skin surface at the animated time according to the skirt-ordering sequence; and determining the feather-proxy elements from the skirt elements.

25. An apparatus according to claim 22, wherein the computer further includes computer instructions for:

determining feather-proxy-placement curves on the skin surface at selected locations that include the root-attachment points for the feather elements, wherein determining the placement for each of the feather-proxy elements at the animated time includes:

forming the feather-proxy elements at the animated time by extending the feather-proxy-placement curves outwardly from the skin surface through an interpolation of nearby skirt elements at the animated time; and adjusting one or more control points of the feather-proxy elements to avoid intersections with the skin surface and with feather-proxy elements that are earlier in the feather-ordering sequence.

26. An apparatus according to claim 22, wherein the computer further includes computer instructions for:

determining the positions for the skin surface at the animated time by animating the skin surface to the animated time from an initial time associated with the initial positions.

27. An apparatus according to claim 22, wherein the animated time is a first animated time and the computer further includes computer instructions for:

specifying positions for the skin surface at a second animated time;

determining a placement for each of a plurality of second feather-proxy elements according to the feather ordering sequence and the initial placement of the plurality of feather elements;

deforming the plurality of second feather-proxy elements, which provide spatial extensions for the feather elements at the second animated time, wherein the second feather-proxy elements are deformed so as to not interfere with the subsequent positions of the skin surface, and wherein the second feather-proxy elements satisfy a separation criterion for avoiding intersections between the second feather-proxy elements; and determining a second subsequent placement for each of the feather elements at the second animated time by extracting the feather elements from the second feather-proxy elements, wherein the placement of the feather elements at the first and second animated times provide consistent relative placement of the feather elements.

28. An apparatus according to claim 22, wherein the computer includes a processor with memory for executing at least some of the computer instructions.

29. An apparatus for determining a feather-ordering sequence for animating feather elements, the apparatus comprising a computer for executing computer instructions, wherein the computer includes computer instructions for:

specifying initial positions for a skin surface;

specifying an initial placement for each of a plurality of feather elements, each feather element including a shaft having a root at a proximal end for attaching the feather element to the skin surface at a root-attachment point and a tip at a distal end away from the skin surface, and the feather element further including vane structures extending laterally from the shaft;

determining an initial vector field on at least a portion of the skin surface from the initial placement for each of the feather elements, wherein the initial vector field includes a plurality of vectors and each vector has a magnitude and a direction;

determining a feather-ordering gradient vector field from the initial vector field to enable a mathematical integration of the feather-ordering gradient vector field; and determining a feather-ordering scalar function through an integration of the feather-ordering gradient vector field, wherein values of the feather-ordering scalar function at the root-attachment points of the feather elements determine the feather-ordering sequence for animating the feathers.

30. An apparatus according to claim 29, wherein the computer further includes computer instructions for:

determining a plurality of skirt-placement curves on the skin surface by evaluating the feather-ordering scalar function at selected locations on the skin surface; and determining a skirt-ordering sequence for placing a plurality of skirt elements on the skin surface from values of the feather-ordering scalar function on the skirt-placement curves, wherein the skirt elements provide spatial extensions for the skin surface.

31. An apparatus according to claim 29, wherein the computer further includes computer instructions for:
determining feather-proxy-placement curves on the skin surface by evaluating the feather-ordering scalar function to determine feather-proxy-placement curves that include the root-attachment points of the feather elements;
forming a plurality of feather-proxy elements according to the feather-ordering sequence by extending portions of the feather-proxy-placement curves outwardly from the skin surface through an interpolation of nearby surface-defining elements;
adjusting one or more control points of the feather-proxy elements to avoid intersections with the skin surface and with feather-proxy elements that are earlier in the feather-ordering sequence; and
extracting updated positions for the feather elements from the adjusted feather proxy elements.

32. An apparatus according to claim 29, wherein the computer includes a processor with memory for executing at least some of the computer instructions.

33. A computer-readable medium that stores a computer program for animating feather elements, the computer program comprising instructions for:
specifying initial positions for a skin surface;
specifying an initial placement for each of a plurality of feather elements, each feather element including a shaft having a root at a proximal end for attaching the feather element to the skin surface at a root-attachment point and a tip at a distal end away from the skin surface, and the feather element further including vane structures extending laterally from the shaft;
specifying a subsequent position for the skin surface at an animated time;
determining a feather-ordering sequence for placing the feather elements on the skin surface;
determining a placement for each of a plurality of feather-proxy elements according to the feather ordering sequence and the initial placement of the plurality of feather elements;
deforming the plurality of feather-proxy elements, which provide spatial extensions for the feather elements at the animated time, wherein the feather-proxy elements are deformed so as to not interfere with the subsequent positions of the skin surface,
and wherein the feather-proxy elements satisfy a separation criterion for avoiding intersections between the feather-proxy elements; and
determining a subsequent placement for each of the feather elements at the animated time by extracting feather elements from the feather-proxy elements.

34. A computer-readable medium according to claim 33, wherein the computer program further includes instructions for:
determining a feather-ordering scalar function defined on at least a portion of the skin surface so that values of the feather-ordering scalar function at the root-attachment points of the feather elements determine the feather-ordering sequence.

35. A computer-readable medium according to claim 33, wherein the computer program further includes instructions for:
determining skirt-placement curves on the skin surface at selected locations on the skin surface for placing skirt elements;
determining a skirt-ordering sequence for placing the skirt elements on the skin surface, wherein determining the positions for the skirt elements at the animated time includes placing the skirt elements on the skin surface at the animated time according to the skirt-ordering sequence; and
determining the feather-proxy elements from the skirt elements.

36. A computer-readable medium according to claim 33, wherein the computer program further includes instructions for:
determining feather-proxy-placement curves on the skin surface at selected locations that include the root-attachment points for the feather elements, wherein determining the positions for the feather-proxy elements at the animated time includes:
forming the feather-proxy elements at the animated time by extending the feather-proxy-placement curves outwardly from the skin surface through an interpolation of nearby skirt elements at the animated time; and
adjusting one or more control points of the feather-proxy elements to avoid intersections with the skin surface and with feather-proxy elements that are earlier in the feather-ordering sequence.

37. A computer-readable medium according to claim 33, wherein the computer program further includes instructions for:
determining the positions for the skin surface at the animated time by animating the skin surface to the animated time from an initial time associated with the initial positions.

38. A computer-readable medium according to claim 33, wherein the animated time is a first animated time and the computer program further includes instructions for:
specifying positions for the skin surface at a second animated time;
determining a placement for each of a plurality of second feather-proxy elements according to the feather ordering sequence and the initial placement of the plurality of feather elements;
deforming the plurality of second feather-proxy elements, which provide spatial extensions for the feather elements at the second animated time, wherein the second feather-proxy elements are deformed so as to not interfere with the subsequent positions of the skin surface,
and wherein the second feather-proxy elements satisfy a separation criterion for avoiding intersections between the second feather-proxy elements; and
determining a second subsequent placement for each of the feather elements at the second animated time by extracting the feather elements from the second feather-proxy elements, wherein the positions of the feather elements at the first and second animated times provide consistent relative placement of the feather elements.

39. A computer-readable medium that stores a computer program for determining a feather-ordering sequence for animating feather elements, the computer program comprising instructions for:
specifying initial positions for a skin surface;
specifying an initial placement for each of a plurality of feather elements, each feather element including a shaft having a root at a proximal end for attaching the feather element to the skin surface at a root-attachment point and a tip at a distal end away from the skin surface, and the feather element further including vane structures extending laterally from the shaft;

determining an initial vector field on at least a portion of the skin surface from the initial placement for each of the feather elements, wherein the initial vector field includes a plurality of vectors and each vector has a magnitude and a direction;

determining a feather-ordering gradient vector field from the initial vector field to enable a mathematical integration of the feather-ordering gradient vector field; and determining a feather-ordering scalar function through a mathematical integration of the feather-ordering gradient vector field, wherein values of the feather-ordering scalar function at the root-attachment points of the feather elements determine the feather-ordering sequence for animating the feathers.

40. A computer-readable medium according to claim 39, wherein the computer program further includes instructions for:

determining a plurality of skirt-placement curves on the skin surface by evaluating the feather-ordering scalar function at selected locations on the skin surface; and determining a skirt-ordering sequence for placing a plurality of skirt elements on the skin surface from values of the feather-ordering scalar function on the skirt-placement curves, wherein the skirt elements provide spatial extensions for the skin surface.

41. A computer-readable medium according to claim 39, wherein the computer program further includes instructions for:

determining feather-proxy-placement curves on the skin surface by evaluating the feather-ordering scalar function to determine feather-proxy-placement curves that include the root-attachment points of the feather elements;

forming a plurality of feather-proxy elements according to the feather-ordering sequence by extending portions of the feather-proxy-placement curves outwardly from the skin surface through an interpolation of nearby surface-defining elements;

adjusting one or more control points of the feather-proxy elements to avoid intersections with the skin surface and with feather-proxy elements that are earlier in the feather-ordering sequence; and extracting updated positions for the feather elements from the adjusted feather proxy elements.

* * * * *

UNITED STATES PATENT AND TRADEMARK OFFICE
CERTIFICATE OF CORRECTION

PATENT NO. : 7,649,535 B2 Page 1 of 1
APPLICATION NO. : 11/408805
DATED : January 19, 2010
INVENTOR(S) : Galen Gerald Gornowicz et al.

It is certified that error appears in the above-identified patent and that said Letters Patent is hereby corrected as shown below:

In column 1, line 14, after "6,952,218)" insert -- . --.

In column 5, line 23, after "1990)" insert -- . --.

In column 6, line 47, delete "Marsdan" and insert -- Marsden --, therefor.

In column 8, line 42, delete "Marsdan" and insert -- Marsden --, therefor.

In column 11, line 62, delete "$B_2(r) \ B_3(r)$" and insert -- $B_2(r), B_3(r),$ --, therefor.

In column 13, line 23, after "(i.e.," delete "$w_i \leq 0$" and insert -- $w_i \geq 0$ --, therefor.

In column 15, line 38, delete "the they" and insert -- they --, therefor.

In column 19, line 5, in Claim 9, delete "skiff-" and insert -- skirt --, therefor.

In column 20, line 45, in Claim 19, delete "skiff-" and insert -- skirt --, therefor.

In column 20, line 49, in Claim 20, delete "skiff-" and insert -- skirt --, therefor.

In column 21, line 46, in Claim 24, after "determining" delete "a".

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,649,535 B2
APPLICATION NO. : 11/408805
DATED : January 19, 2010
INVENTOR(S) : Gornowicz et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 882 days.

Signed and Sealed this

Twenty-third Day of November, 2010

David J. Kappos
*Director of the United States Patent and Trademark Office*